United States Patent
Sato et al.

(10) Patent No.: US 11,809,666 B2
(45) Date of Patent: *Nov. 7, 2023

(54) TOUCH-SENSITIVE BRAIDED CORD

(71) Applicant: Google LLC, Mountain View, CA (US)

(72) Inventors: Munehiko Sato, Tokyo (JP); Ivan Poupyrev, Sunnyvale, CA (US); Shozo Harada, Hachioji (JP); Shiho Fukuhara, Tokyo (JP)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,139

(22) Filed: Dec. 27, 2022

(65) Prior Publication Data

US 2023/0130821 A1    Apr. 27, 2023

Related U.S. Application Data

(63) Continuation of application No. 17/436,337, filed as application No. PCT/US2019/020650 on Mar. 5, 2019, now Pat. No. 11,567,616.

(51) Int. Cl.
*G06F 3/044* (2006.01)

(52) U.S. Cl.
CPC .......... *G06F 3/0444* (2019.05); *G06F 3/0447* (2019.05); *G06F 3/0448* (2019.05)

(58) Field of Classification Search
CPC .... G06F 3/0444; G06F 3/0447; G06F 3/0448; G06F 3/044; G06F 3/0416; H04R 1/1041
See application file for complete search history.

(56) References Cited

U.S. PATENT DOCUMENTS

| | | |
|---|---|---|
| 6,917,737 B2 | 7/2005 | Uhlenhuth et al. |
| 8,436,820 B2 | 5/2013 | Jeong et al. |
| 9,652,091 B1 | 5/2017 | Obeidat |
| 10,047,459 B1 | 8/2018 | Starner et al. |
| 10,083,289 B1 | 9/2018 | Starner et al. |
| 10,111,304 B2 | 10/2018 | Starner et al. |

(Continued)

FOREIGN PATENT DOCUMENTS

| | | |
|---|---|---|
| JP | 2011102457 | 5/2011 |
| JP | 2012529844 | 11/2012 |

(Continued)

OTHER PUBLICATIONS

Capacitive Sensing (CapSense® CSD) 3.40, Cypress Perform 2014, 103 pages.

(Continued)

*Primary Examiner* — Amit Chatly
(74) *Attorney, Agent, or Firm* — Dority & Manning, P.A.

(57) ABSTRACT

An interactive cord includes one or more touch-sensitive areas configured to detect user input and one or more non-touch-sensitive areas. An outer cover of the interactive cord includes a set of conductive lines braided together with one or more of a plurality of non-conductive lines at the touch-sensitive area. The set of conductive lines defines a plurality of intersections that each form a capacitive touchpoint at the touch-sensitive area. An inner core of the interactive cord includes at least the set of conductive lines and at least one of the plurality of non-conductive lines at the non-touch-sensitive area.

21 Claims, 16 Drawing Sheets

(56) References Cited

U.S. PATENT DOCUMENTS

| 10,149,036 | B1 | 12/2018 | Starner et al. |
| 11,567,616 | B2 * | 1/2023 | Sato ..................... H04R 1/1041 |
| 2006/0076540 | A1 | 4/2006 | Zama et al. |
| 2006/0124470 | A1 | 6/2006 | Zama et al. |
| 2008/0050550 | A1 | 2/2008 | Orth |
| 2010/0163283 | A1 | 7/2010 | Hamedi et al. |
| 2014/0070957 | A1 | 3/2014 | Longinotti-Buitoni et al. |
| 2017/0037548 | A1 | 2/2017 | Lee |
| 2017/0115777 | A1 * | 4/2017 | Poupyrev ............ G06F 3/04883 |
| 2018/0049296 | A1 * | 2/2018 | Starner .................. H05B 45/00 |
| 2018/0173341 | A1 | 6/2018 | Leigh et al. |
| 2018/0258562 | A1 | 9/2018 | Fukuhara |
| 2018/0357405 | A1 | 12/2018 | Starner et al. |
| 2019/0094097 | A1 | 3/2019 | Cavalheiro et al. |

FOREIGN PATENT DOCUMENTS

| WO | WO 2015/125189 | 8/2015 |
| WO | WO 2016/053624 | 4/2016 |

OTHER PUBLICATIONS

International Preliminary Report on Patentability and Written Opinion for Application No. PCT/US2019/020650, dated Sep. 16, 2021, 12 pages.

International Search Report and Written Opinion for Application No. PCT/US2019/020650, dated Oct. 31, 2019, 16 pages.

Olwal et al., "I/O Braid: Scalable Touch-Sensitive Lighted Cords Using Spiraling, Repeating Sensing Textiles and Fiber Optics", 31st Annual Association for Computing Machinery Symposium on User Interface Software and Technology, UIST '18, Berlin, Germany, Oct. 14-17, 2018, pp. 485-497.

Xiao et al., "Lumitrack: Low Cost, High Precision, High Speed Tracking with Projected m-Sequences", 26th Annual Association for Computing Machinery Symposium on User Interface Software and Technology, St. Andrews, United Kingdom, Oct. 8-11, 2013, 13 pages.

* cited by examiner

TOUCH-SENSITIVE BRAIDED CORD

PRIORITY CLAIM

The present application is a continuation of U.S. application Ser. No. 17/436,337 having a filing date of Sep. 3, 2021, which is based upon and claims the right of priority under 35 U.S.C. § 371 to International Application No. PCT/US2019/020650, filed Mar. 5, 2019, which is incorporated herein by reference in its entirety.

FIELD

The present disclosure relates generally to interactive objects including touch-sensors.

BACKGROUND

In-line controls for cords are common for devices including earbuds or headphones for music players, cellular phone usage, and so forth. Similar in-line controls are also used by cords for household appliances and lighting, such as clocks, lamps, radios, fans, and so forth. Generally, such in-line controls utilize unfashionable hardware buttons attached to the cord which can break after extended use of the cord. Conventional in-line controls also have problems with intrusion due to sweat and skin, which can lead to corrosion of internal controls and electrical shorts. Further, the hardware design of in-line controls limits the overall expressiveness of the interface, in that increasing the amount of controls requires more hardware, leading to more bulk and cost.

Accordingly, there remains a need for cords that can provide an adequate interface for controlling devices. Additionally, there remains a need for manufacturing processes that can efficiently and effectively manufacture such objects.

SUMMARY

Aspects and advantages of embodiments of the present disclosure will be set forth in part in the following description, or may be learned from the description, or may be learned through practice of the embodiments.

One example aspect of the present disclosure is directed to an interactive cord. The interactive cord includes an outer cover having a touch-sensitive area at a first longitudinal portion of the interactive cord and a non-touch-sensitive area at second longitudinal portion of the interactive cord. The outer cover includes a set of conductive lines braided together with one or more of a plurality of non-conductive lines at the first longitudinal portion. The set of conductive lines defines a plurality of intersections, wherein each intersection forms a capacitive touchpoint at the touch-sensitive area. The interactive cord includes an inner core including at least the set of conductive lines and at least one of the plurality of non-conductive lines at the second longitudinal portion of the interactive cord.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for interactive objects including interactive cords and manufacturing processes for the same.

These and other features, aspects and advantages of various embodiments will become better understood with reference to the following description and appended claims.

The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
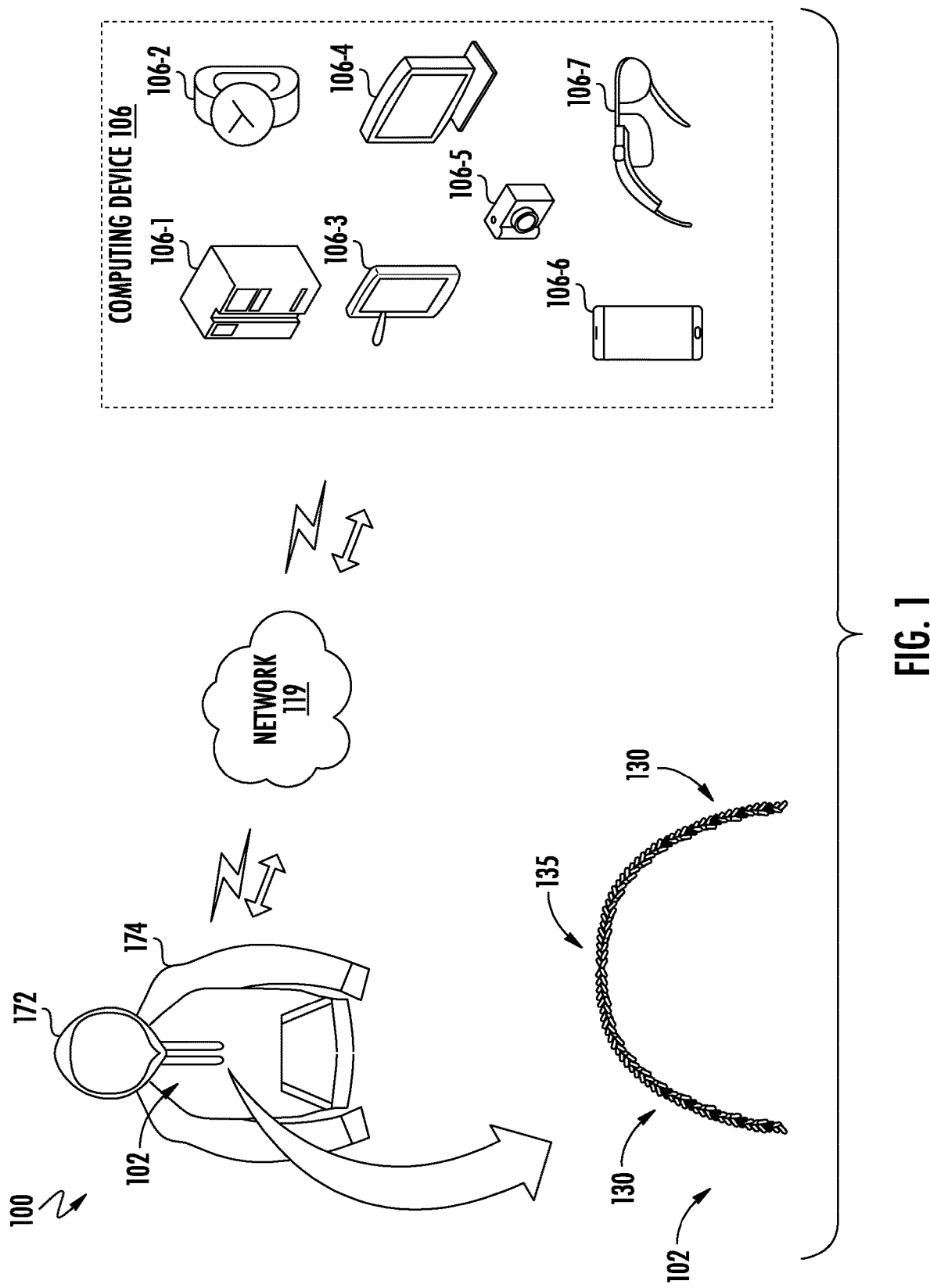
FIG. 1 illustrates an example of a computing environment including an interactive cord in accordance with example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to an interactive cord that includes one or more selective touch-sensitive areas having conductive lines configured to detect user input, and one or more non-touch-sensitive areas where the conductive lines are configured to be inhibited from detecting user input. One or more braiding processes can be used to selectively expose the conductive lines at touch-sensitive area(s), while insulating the conductive lines at non-touch-sensitive areas. By way of example, the interactive cord can process a touch-input to generate touch data that is usable to initiate functionality at the interactive cord, or at various remote devices that can be coupled to the interactive cord, either wirelessly or through a wired connection. For instance, the interactive cord may provide a user interface for adjusting the volume of a speaker, controlling playback of a movie on a mobile device, answering a telephone call, etc.

According to example embodiments, an interactive cord can be formed from a plurality of flexible conductive lines and a plurality of flexible non-conductive lines. The flexible conductive lines may include conductive threads (also referred to as yarns), conductive fibers, fiber optic filaments, flexible metal lines, etc. The flexible non-conductive lines may include non-conductive threads or other flexible fibers, filaments, yarns that provide at least partial separation for the conductive lines. A first longitudinal portion of the interactive cord can be formed at least partially from one or more of the conductive lines that are braided with one or more of the non-conductive lines to form a touch-sensitive area. The first longitudinal portion of the interactive cord is a portion of the interactive cord along its length in a longitudinal direction. The longitudinal direction refers to the direction of an axis running through the center of the interactive cord. The conductive lines braided at the first longitudinal portion define a plurality of capacitive touchpoints where the conductive lines or intersections of the conductive lines are exposed at an outer surface of the interactive cord. The interactive cord can include a non-touch-sensitive area where the plurality of conductive lines are inhibited from detecting external touch due to capacitive coupling. For example, the interactive cord can include an inner core that is surrounded by an outer cover. The conductive lines can be positioned within the inner core at the second longitudinal portion to form the non-touch-sensitive area.

In this manner, a touch-sensitive area can be selectively formed for an interactive cord. A resulting interactive cord may represent an improvement over existing braided structures that include a consistent repetitive pattern that extends along the full length of the interactive cord. An interactive cord with a selective touch-sensitive area may be especially useful to avoid inadvertent inputs from users or external objects such as metallic objects that may come in contact with the cord. By way of example, an interactive cord can be provided as a drawstring for a hoodie of a shirt. Selective touch-sensitive areas can be formed at the end portions of the interactive cord that extend from holes that couple the interactive cord to the shirt. The interactive cord can include a non-touch-sensitive area where the interactive cord extends through the shirt at a collar area that extends around a user's neck when worn. In this manner, the interactive cord may include one or more touch-sensitive areas at portions intended to be accessed by a user and one or more non-touch-sensitive areas at other portions where unintended input is to be avoided.

Touch inputs provided via a capacitive touch sensor as described may include various applications and capabilities. By way of example, a touch sensor may be used as a button to detect a simple touch input at a location of the touch sensor. In some examples, a one-dimensional array of conductive threads may be used to implement a touch sensor that can detect a button-type input. A one-dimensional array of conductive threads may also be used to detect a one-dimensional swipe input (e.g., movement in a single direction corresponding to the spacing between threads). In some examples, a multi-dimensional (e.g., two-dimensional) array of conductive threads may be used to implement a touch sensor that can detect trackpad inputs, including a specific location of a touch within a grid of conductive threads. A multi-dimensional capacitive touch sensor including a two-dimensional array of conductive threads may be used to detect various gesture inputs, authentication inputs, predefined keystrokes, movements, user-specific natural behaviors and the like. One or more machine-learned models may be used to detect user inputs based on training the machine-learned models using training data. Additionally, the touch sensor may be configured to detect analog and pseudo-force inputs from a capacitive change caused by a finger distance.

According to some aspects, an external computing device (e.g., smartphone, tablet, laptop, etc.) can be communicatively coupled to an interactive cord using one or more wireless and/or wired interfaces. A gesture manager can be implemented on the computing device to store mappings between gestures and functionalities of the computing device. A functionality mapped to a gesture can be initiated in response to detecting the gesture at the interactive cord. In some examples, an interactive cord can be configured to selectively respond to gestures based on the location of the gesture relative to the capacitive touch sensor.

According to some implementations, the interactive cord may include a plurality of conductive lines and a plurality of non-conductive lines that are controllably braided in different thread patterns to selectively define one or more touch-sensitive areas for the interactive cord. By way of example, the outer cover may be formed by braiding one or more of the conductive lines with a first subset of non-conductive lines at a first longitudinal portion of the interactive cord corresponding to the touch-sensitive area. The inner core of the interactive cord may include a second subset of the non-conductive lines at the first longitudinal portion. The second subset of non-conductive lines may or may not be braided. At a second longitudinal portion of the interactive cord corresponding to the non-touch-sensitive area, the plurality of conductive lines can be positioned within the inner core. Within the inner core, the conductive lines can be separated in various manners to create the non-touch sensitive area. For example, the separation distance between a set of transmitter conductive lines and a set of receiver conductive lines can be controlled within the inner core. A larger separation between transmitter and receiver pairs can decrease the baseline mutual capacitance of the pairs. This can aid in reducing the change in mutual capacitance of the pair of transmitter and receiver lines due to a finger touch at the non-touch sensitive area. In this manner, the interactive cord can provide robustness against false-positive touches. The outer cover at the second longitudinal portion can be formed by braiding the first subset of non-conductive lines and one or more additional non-conductive lines of the plurality of non-conductive lines. For instance, one or more of the second subset of non-conductive lines can be routed to the outer cover at the second longitudinal portion and braided with the first subset of the non-conductive lines.

According to some implementations, the outer cover of the interactive cord may have a uniform braiding appearance at both the first longitudinal portion and the second longitudinal portion of the interactive cord. For example, the first longitudinal portion may be formed by braiding a first subset of conductive threads with a first subset of non-conductive threads to form a touch-sensitive area. The second longitudinal portion may be formed by braiding the first subset of non-conductive threads with a second subset of non-conductive threads. The number of non-conductive threads in the second subset may be equal to the number of conductive threads in the first subset such that braiding appearance at both the first longitudinal portion and the second longitudinal portion is the same.

Various braiding processes can be used to controllably braid the conductive lines to selectively form touch-sensitive areas for an interactive cord. By way of example, a lace-braiding process can be used in some example embodiments. More particularly, a bobbin-lace-braiding process, also referred to as torchon-lace-braiding process, can be used whereby a plurality of flexible lines (e.g., conductive threads and non-conductive threads) are provided on a plurality of individually-controllable bobbins. A computer-controlled process can be applied to control the bobbins and thereby braid the plurality of flexible lines using a plurality of different braiding patterns to selectively form a touch-sensitive area for a capacitive touch sensor. For instance, a first braiding pattern may be applied to form a touch-sensitive area by braiding one or more conductive lines with one or more non-conductive lines to form the outer cover at a first longitudinal portion of the interactive cord. A second braiding pattern may be applied to form a non-touch-sensitive area by braiding only non-conductive lines to form the outer cover at a second longitudinal portion of the interactive cord. The second braiding pattern may position the conductive lines at the inner core of the interactive cord. The conductive lines may be braided or unbraided within the inner core. The non-conductive lines that are braided to form the outer cover at the non-touch-sensitive area provide a separation distance between the conductive lines within the inner core and an external touch. A uniform braiding appearance can be provided by utilizing a total number of non-conductive lines and conductive lines to form the outer cover at the first longitudinal portion that is equal to a total number of non-conductive lines used to form the outer cover at the second longitudinal portion for the non-touch-sensitive area.

According to some implementations, a touchpad can be formed on the outer cover by braiding conductive threads in opposite circumferential directions using so-called "S" threads and "Z" threads. A first group of one or more S threads can be wrapped in a first circumferential direction (e.g., clockwise) around the interactive cord and a second group of one or more Z threads can be wrapped in a second circumferential direction (e.g., counterclockwise) around the interactive cord at a longitudinal portion of the interactive cord including a touch sensor. Thus, the S and Z conductive threads can cross each other thereby creating the equivalent of a touchpad on the outer cover of the interactive cord. The threads can form a capacitive touch sensor. A mutual capacitance sensing technique can be used whereby one of the groups of S or Z threads are configured as transmitters of the capacitive sensor while the other group of S or Z threads are configured as receivers of the capacitive sensor. When a user's finger touches or is in proximity to an intersection of a pair of the Z and S threads, the location of the touch can be detect from the mutual capacitance sensor that includes the pair of transmitter and receiver conductive threads. In some examples, the touch decreases the distance between a pair of transmitter and receiver lines, thereby increasing the mutual capacitance between the lines.

In some implementations where a mutual capacitive sensing technique is used, the S conductive threads and the Z conductive threads can be positioned within the inner core of the interactive cord at one or more longitudinal portions corresponding to a non-touch-sensitive area. Changes in capacitive coupling resulting from external touch can be decreased by one or more of the non-conductive threads. For example, one or more non-conductive threads can be braided for the outer cover at the one or more longitudinal portions. Within the inner core, the first group of transmitter conductive threads can be separated from the second group of receiver conductive threads. For example, the first group of transmitter conductive threads can be aligned as a first cluster of conductive threads within the inner core. The second group of receiver conductive threads can be aligned as a second cluster of conductive threads within the inner core. The first group of transmitter conductive threads can be separated from the second group of receiver conductive threads within the inner core at the one or more longitudinal portions corresponding to the non-touch-sensitive areas. One or more non-conductive threads can be positioned between the first group and the second group of conductive threads to provide separation between the two clusters. By separating the different groups, a decrease in the baseline mutual capacitance of transmitter/receiver pairs can be created. By decreasing the baseline mutual capacitance, a non-touch-sensitive area can be created.

In another example, one group of conductive threads (e.g., the transmitter lines) can be grouped together as a cluster within the inner core. For instance, the group can be clustered at the center of the inner core within the interactive cord. The other group of conductive threads (e.g., the receiver lines) can be spaced apart from the first group of conductive threads in a radial direction of the interactive cord. For example, the second group of conductive threads can be formed in an outer portion of the inner core with each conductive thread of the second group being spaced apart from other conductive threads of the second group in a circumferential direction of the interactive cord. One or more non-conductive threads can be positioned between each conductive thread of the second group in the circumferential direction. One or more additional non-conductive threads can be positioned between the second group of conductive threads and the first group of conductive threads positioned as a cluster within the inner core.

In accordance with some implementations, a non-repetitive pattern of capacitive touch points can be formed to provide a coded pattern on the outer cover of the interactive cord. By way of example, a set of transmitter conductive threads can be wrapped around the interactive cord in a first direction and a set of receiver conductive threads can be wrapped around the interactive cord in the second direction. A touch at an intersection of one of the transmitter conductive threads and one of the receiver conductive threads can be detected. More particularly in some examples, a touch to each of the transmitter conductive threads can be individually detected. The coded pattern can be created by changing the intersection pattern of the conductive threads. The pattern by which corresponding pairs of transmitter/receiver threads intersect can be varied to create a coded pattern. For instance, the threads may be braided to form a non-repetitive pattern at the outer cover. By way of example, a sequence may be formed using a pair of four transmitter and four receiver threads that includes a non-repetitive pattern of intersections. Each sequence of four intersections can be individually detected, by a user swiping over the intersections in sequence and/or touching all four intersections at once. This pattern can be used to detect a position of the user's touch in some examples. For example, the location of each sequence may be stored in a table or mapping of locations to patterns. A detection of a particular sequence can then be mapped to a location on the interactive cord.

According to some implementations, one or more of the conductive threads of an interactive cord can have a visual appearance, such as a color, that distinguishes the conductive thread from other conductive threads or non-conductive lines. The colored conductive threads can be used to generate a visual element on the outer surface of the interactive cord. In some examples, the visual element can correspond to a function of the interactive cord and/or a computing device, or can provide an instruction or guidance to user as to how to use the interactive cord. By way of example, a conductive thread can be braided for the interactive cord to generate a visual element corresponding to a letter of the alphabet. The conductive threads used to create a visual element can be mapped to a function that provides an input associated with the letter of the alphabet such as a keyboard type input. In another example, the visual element may provide an indication to a user as to where to provide text input. In some examples, a coded sequence or pattern as earlier described may be used with a visual element. For example, one or more conductive threads can be used to create a particular pattern of capacitive touch point that can be uniquely detected by a controller. The pattern of capacitive touch points can be formed while creating a visual element. Input provided the visual element will result in the coded pattern being actuated.

According to some example implementations, the interactive cord can include an internal electronics module that is integrated into the interactive cord or an object (e.g, garment, hard object) to which the interactive cord is attached. The interactive cord can be directly attached to the internal electronics module or can be attached to the internal electronics module via one or more connector components. The internal electronics module can provide power and/or control signals to the interactive cord. The internal electronics module may not include an on-board power source in some embodiments. Instead, a removable electronics module can supply power to the internal electronics module.

In some examples, the internal electronics module can include a first subset of electronic components, such as one or more drivers configured to provide control signals and/or power to the interactive cord. In some embodiments, a removable electronics module that includes a second subset of electronic components (e.g., a microprocessor, power source, or network interface) can be removably coupled to the interactive object via a communication interface. The communication interface enables communication between the internal electronics module and the removable electronics module when the removable electronics module is coupled to the interactive cord.

Systems and methods in accordance with the disclosed technology provide a number of technical effects and benefits. Typical integrations of conductive lines within interactive objects may not facilitate a large number of input gestures or the selective placement of touch-sensitive areas. For instance, a traditional interactive cord using conductive threads may be formed with a consistent repetitive pattern along the entire outer surface of the interactive cord. Such a design has considerable drawbacks and limitations. For example, the use of a repetitive pattern does not allow a significant number of gestures to be interpreted. For example, a particular location of touch within the interactive cord may not be possible. A touch at any portion of a conductive line may be detected but a location of the touch may be undetermined. Additionally, the conductive threads typically extend along the entire outer length of the interactive cord. In this manner, it is not possible to selectively form touch-sensitive areas. Accordingly, it is likely that inadvertent inputs will be received by the interactive cord at locations that are not desired.

Embodiments of the disclosed technology provide a number of technical effects and benefits particularly with respect to increasing a number of potential input gestures as well as selectively forming touch-sensitive areas. By way of example, the braiding technique can be used whereby conductive lines are selectively formed and exposed on the outer surface of the interactive cord. In this manner, selective formation of touch-sensitive areas can be achieved. This can facilitate better integration of interactive cords within object such as garments. For example, a particular location for a touch-sensitive area on a shoestring or drawstring can be formed. This can avoid the detection of inadvertent inputs by a user or external object at other locations along the interactive cord that are not desirable. Moreover, a non-repetitive coded pattern can be provided by utilizing a braiding technique to allow particular sequences of actuations to be detected, thereby increasing the number of potential input gestures that can be detected.

FIG. 1 is an illustration of an example environment 100 in which techniques using, and objects including, an interactive cord in accordance with example embodiments may be implemented. Environment 100 includes an interactive cord 102, which is illustrated as a drawstring for a hoodie or other wearable garment in this particular example. More particularly, interactive cord 102 is formed as a drawstring that extends around a hood 172 of the garment 174. Interactive cord 102 includes one or more touch-sensitive areas 130 including conductive lines configured to detect user input and one or more non-touch-sensitive areas 135 where the conductive lines are configured to not detect touch input due to capacitive sensing. In example computing environment 100, interactive cord 102 includes two touch-sensitive areas 130 and one non-touch-sensitive area 135. It is noted that any number of touch-sensitive areas 130 and/or non-touch-sensitive areas 135 may be included in interactive cord 102. Interactive cord 102 can include touch-sensitive areas 130 where the interactive cord extends from an enclosure of the hood and can include a non-touch-sensitive area 135 where interactive cord 102 wraps around a neck opening of the hood of the garment. In this manner, inadvertent inputs by contact of the user's neck or other portion of their skin with the interactive cord extending around the neck portion can be avoided.

While interactive cord 102 may be described as a cord or string for a garment or accessory, it is to be noted that interactive cord 102 may be utilized for various different types of uses, such as cords for appliances (e.g., lamps or fans), USB cords, SATA cords, data transfer cords, power cords, headset cords, or any other type of cord. In some examples, interactive cord 102 may be a standalone device. For instance, interactive cord 102 may include a communication interface that permits data indicative of input received at the interactive cord to be transmitted to one or more remote computing endpoints, such as a cellphone, personal computer, or cloud computing device. In some implementations, an interactive cord 102 may be incorporated within an interactive object. For example, an interactive cord may form the drawstring of a shirt (e.g., hoodie) or pants, shoe laces, etc.

Interactive cord 102 enables a user to control an interactive object such as garment 174 that the interactive cord 102 is integrated with, or to control a variety of other computing devices 106 via a network 119. Computing devices 106 are illustrated with various non-limiting example devices: server 106-1, smart watch 106-2, tablet 106-3, desktop 106-4, camera 106-5, smart phone 106-6, and computing spectacles 106-7, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers).

Network 119 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Interactive cord 102 can interact with computing devices 106 by transmitting touch data or other sensor data through network 119. Computing device 106 uses the touch data to control computing device 106 or applications at computing device 106. As an example, consider that interactive cord 102 integrated at garment 174 may be configured to control the user's smart phone 106-6 in the user's pocket, desktop 106-4 in the user's home, smart watch 106-2 on the user's wrist, or various other appliances in the user's house, such as thermostats, lights, music, and so forth. For example, the user may be able to swipe up or down on interactive cord 102 integrated within the user's garment 174 to cause the volume on a television to go up or down, to cause the temperature controlled by a thermostat in the user's house to increase or decrease, or to turn on and off lights in the user's house. Note that any type of touch, tap, swipe, hold, or stroke gesture may be recognized by interactive cord 102.

Figure 2:
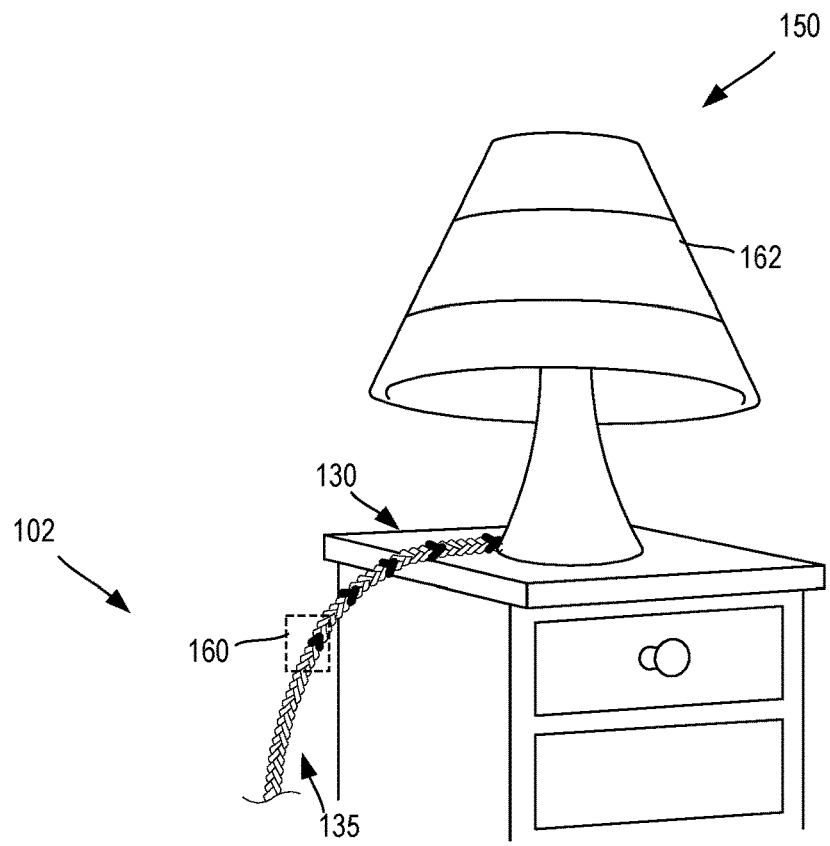
FIG. 2 illustrates an example of a computing environment including an interactive cord in accordance with example embodiments of the present disclosure.

FIG. 2 illustrates an additional example environment 150 in which interactive cord 102 can be implemented. At environment 150, interactive cord 102 is implemented as a power cord for a lamp 162. In this example, interactive cord 102 may be configured to receive touch input usable to turn on and off the lamp and/or to adjust the brightness of the lamp. In this example, interactive cord includes a single touch-sensitive area 130 in the portion of the interactive cord 102 adjacent to the lamp 162, and a single non-touch-sensitive area 135 extending from the touch-sensitive area 130 to the opposite end portion. In other examples, interactive cord 102 may be configured as a data transfer cord configured to transfer data (e.g., media files) between computing devices 106. Interactive cord 102 may be configured to receive touch input usable to initiate the transfer, or pause the transfer, of data between devices. Interactive cord 102 may include any number of touch-sensitive areas non-touch-sensitive areas.

Figure 3:
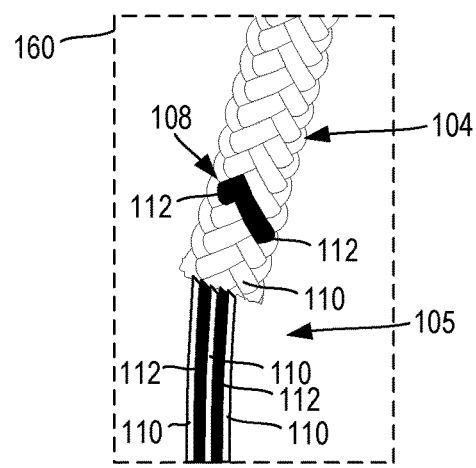
FIG. 3 illustrates an example of an interactive cord in accordance with example embodiments of the present disclosure.

Interactive cord 102 includes an outer cover 104 surrounding an inner core 105 as shown in the cutaway view of region 160 depicted in FIG. 3. In this example, outer cover 104 is configured to sense touch input using capacitive sensing. To do so, outer cover 104 includes one or more conductive lines 112 that are braided with one or more non-conductive lines 110 to form the outer cover 104. Generally, a conductive line 112 such as a conductive thread corresponds to line that is flexible, but includes a wire that changes capacitance in response to human input. For example, when a finger of a user's hand approaches a conductive thread, the finger causes the capacitance of the conductive thread to change.

To enable outer cover 104 to sense touch input, the outer cover is constructed with one or more capacitive touchpoints 108. Capacitive touchpoints 108 correspond to positions on outer cover 104 that will cause a change in capacitance to conductive line 112 when a user's finger touches, or comes in close contact with, capacitive touchpoint 108. In one or more implementations, the braiding pattern of outer cover 104 exposes conductive line 112 at the capacitive touchpoints 108. In FIG. 1, for example, conductive line 112 is exposed at capacitive touchpoints 108, but is otherwise not visible.

One or more braiding processes can be used to selectively expose the conductive lines at the touch-sensitive area(s) to define capacitive touchpoints 108, while insulating the conductive lines at non-touch-sensitive areas. To facilitate the selective formation of touch-sensitive areas of interactive cord 102, multiple braiding patterns may be applied when forming interactive cord 102 to selectively position conductive lines 112 where touch-sensitive areas are desired.

At a longitudinal portion along a length of the interactive cord forming a touch-sensitive area 130, one or more of the conductive lines 112 are braided with one or more of the non-conductive lines 110 to form a touch-sensitive area. The conductive lines are braided at the first longitudinal portion to define a plurality of capacitive touchpoints 108 where the conductive line or intersections of the conductive lines are exposed at the outer cover 104 of the interactive cord. The interactive cord can include a non-touch-sensitive area 135 where the plurality of conductive lines are inhibited from detecting touch input due to changes in capacitance. For example, the conductive lines can be positioned within the inner core 105 and surrounded by non-conductive lines 110 used to form the outer cover. Additional non-conductive lines 110 may be formed within the inner core 105, for example, to separate one or more of the conductive lines from each other. Although not shown, inner core 105 may include additional wires or cables in some embodiments. For example, a cable configured to communicate audio to a headset may be included within inner core 105. In other examples, a cable within the inner core can be implemented to transfer power, data, or any other electrical signal.

A controller may provide functionality to sense touch input to capacitive touchpoints 108 of interactive cord 102, and to trigger various functions based on the touch input. A remote computing device 106 and/or electronics within the interactive cord or an object the interactive cord is integrated with may include a controller. For example, a controller can be configured to, in response to touch input to capacitive touchpoints 108, start playback of audio to the mobile computing device, pause audio, skip to a new audio file, adjust the volume of the audio, and so forth. In some examples, a controller may include a gesture manager implemented as one or more computer readable instructions. A controller can be implemented at a computing device 106, however, in alternate implementations, a controller may be integrated within interactive cord 102, or implemented with another device, such as powered headphones, a lamp, a clock, and so forth.

Figure 4:
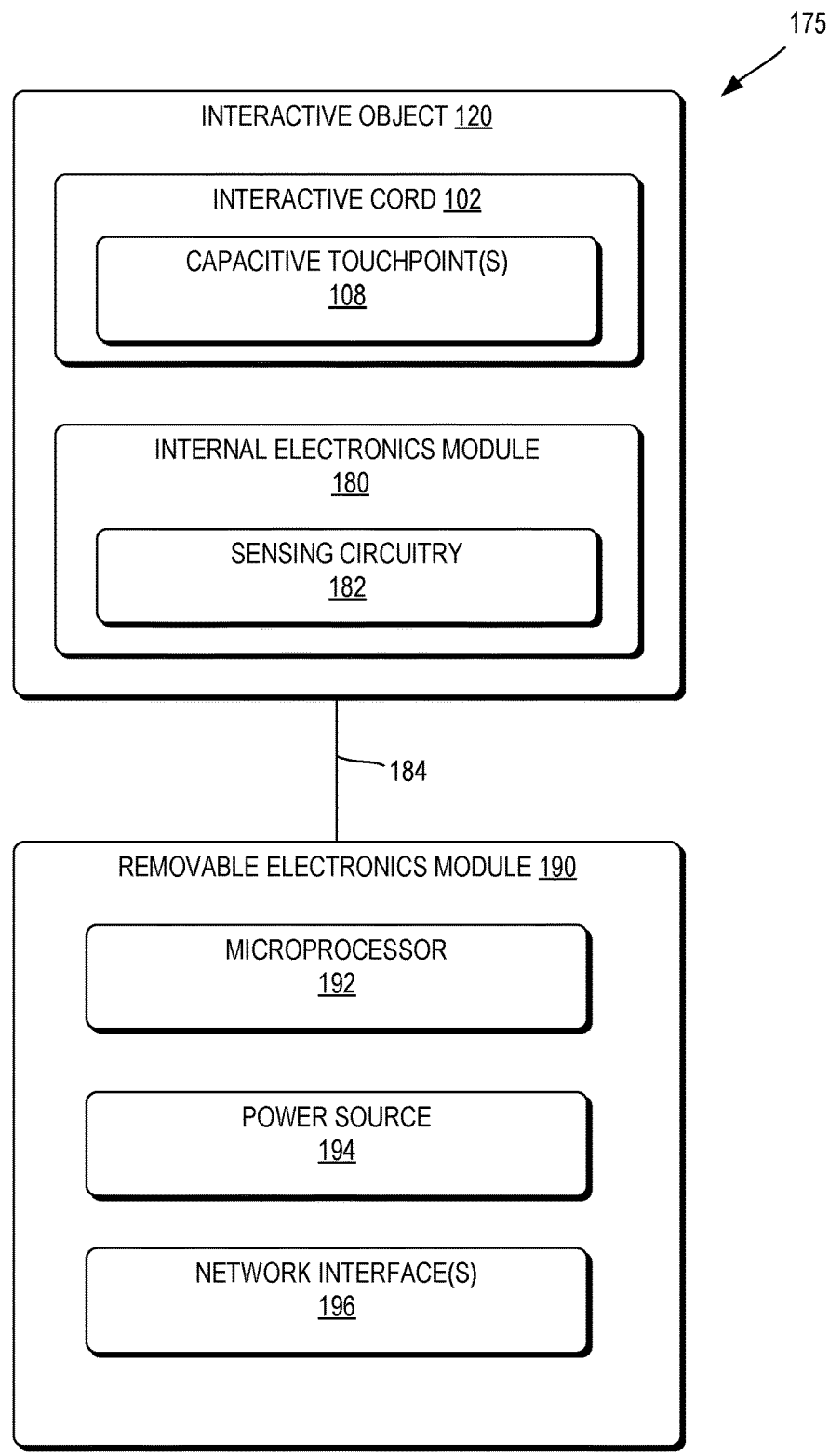
FIG. 4 illustrates a block diagram of an example system that includes an interactive cord and a removable electronics module in accordance with example embodiments of the present disclosure.

In more detail, consider FIG. 4 which illustrates an example system 175 that includes an interactive cord 102 and multiple electronics modules. In system 175, interactive cord 102 is integrated in an object 120, which may be implemented as a flexible object (e.g., shirt, hat, or handbag) or a hard object (e.g., plastic cup or smart phone casing). In yet other examples, interactive cord 102 may itself form the interactive object 120.

Interactive cord 102 is configured to sense touch-input from a user when one or more fingers of the user's hand touch interactive cord 102 at a touch-sensitive area. Interactive cord 102 may be configured to sense single-touch, multi-touch, and/or full-hand touch-input from a user. To enable the detection of touch-input, interactive cord 102 includes capacitive touchpoints 108, which as described can be formed from one or more conductive lines (e.g., conductive fiber, threads or fiber optic filaments not shown). Notably, the capacitive touchpoints 108 do not alter the flexibility of interactive cord 102 in example embodiments, which enables interactive cord 102 to be easily integrated within interactive objects 120.

Interactive object 120 includes an internal electronics module 180 that is embedded within interactive object 120 and is directly coupled to conductive lines that form capacitive touchpoints 108. Internal electronics module 180 can be communicatively coupled to a removable electronics module 190 via a communication interface 184. Internal electronics module 180 contains a first subset of electronic components for the interactive object 120, and removable electronics module 190 contains a second, different, subset of electronics components for the interactive object 120. As described herein, the internal electronics module 180 may be physically and permanently embedded within interactive object 120, whereas the removable electronics module 190 may be removably coupled to interactive object 120.

In system 175, the electronic components contained within the internal electronics module 180 include sensing circuitry 182 that is coupled to conductive lines 112 that are braided to form interactive cord 102. For example, wires from conductive threads may be connected to sensing circuitry 182 using flexible PCB, creping, gluing with conductive glue, soldering, and so forth. In one embodiment, the sensing circuitry 182 can be configured to detect a user-inputted touch-input on the conductive threads that is preprogrammed to indicate a certain request. In one embodiment, when the conductive threads form a grid or other pattern, sensing circuitry 182 can be configured to also detect the location of the touch-input on conductive line 112, as well as motion of the touch-input. For example, when an object, such as a user's finger, touches conductive line 112, the position of the touch can be determined by sensing circuitry 182 by detecting a change in capacitance on the grid or array of conductive line. The touch-input may then be used to generate touch data usable to control a computing device 106. For example, the touch-input can be used to determine various gestures, such as single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the cord with a user's entire hand, covering the cord with the user's entire hand, pressing the textile with the user's entire hand, palm touches, and rolling, twisting, or rotating the user's hand while touching the textile).

Communication interface 184 enables the transfer of power and data (e.g., the touch-input detected by sensing circuitry 182) between the internal electronics module 180 and the removable electronics module 190. In some implementations, communication interface 184 may be implemented as a connector that includes a connector plug and a connector receptacle. The connector plug may be implemented at the removable electronics module 190 and is configured to connect to the connector receptacle, which may be implemented at the interactive object 120.

In system 175, the removable electronics module 190 includes a microprocessor 192, power source 194, and network interface 196. Power source 194 may be coupled, via communication interface 184, to sensing circuitry 182 to provide power to sensing circuitry 182 to enable the detection of touch-input, and may be implemented as a small battery. In one or more implementations, communication interface 184 is implemented as a connector that is configured to connect removable electronics module 190 to internal electronics module 180 of interactive object 120. When touch-input is detected by sensing circuitry 182 of the internal electronics module 180, data representative of the touch-input may be communicated, via communication interface waiting for, to microprocessor 192 of the removable electronics module 190. Microprocessor 192 may then analyze the touch-input data to generate one or more control signals, which may then be communicated to computing device 106 (e.g., a smart phone) via the network interface 196 to cause the computing device 106 to initiate a particular functionality. Generally, network interfaces 196 are configured to communicate data, such as touch data, over wired, wireless, or optical networks to computing devices 106. By way of example and not limitation, network interfaces 216 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through a network).

In example embodiments, the removable electronics module can be removably mounted to a rigid member on the interactive cord or another object (e.g., garment) to which the interactive cord is attached. A connector can include a connecting device for physically and electrically coupling to the removable electronics module. The internal electronics module can be in communication with the connector. The internal electronics module can be configured to communicate with the removable electronics module when connected to the connector. A controller of the removable electronics module can receive information and send commands to the internal electronics module. The communication interface 184 is configured to enable communication between the internal electronics module and the controller when the connector is coupled to the removable electronics module. For example, the communication interface may comprise a network interface integral with the removable electronics module. The removable electronics module can also include a rechargeable power source. The removable electronics module can be removable from the interactive cord for charging the power source. Once the power source is charged, the removable electronics module can then be placed back into the interactive cord and electrically coupled to the connector.

While internal electronics module 180 and removable electronics module 190 are illustrated and described as including specific electronic components, it is to be appreciated that these modules may be configured in a variety of different ways. For example, in some cases, electronic components described as being contained within internal electronics module 180 may be at least partially implemented at the removable electronics module when 90, and vice versa. Furthermore, internal electronics module 180 and removable electronics module when one 90 may include electronic components other that those illustrated in FIG. 4, such as sensors, light sources (e.g., LED's), displays, speakers, and so forth.

Figure 5:
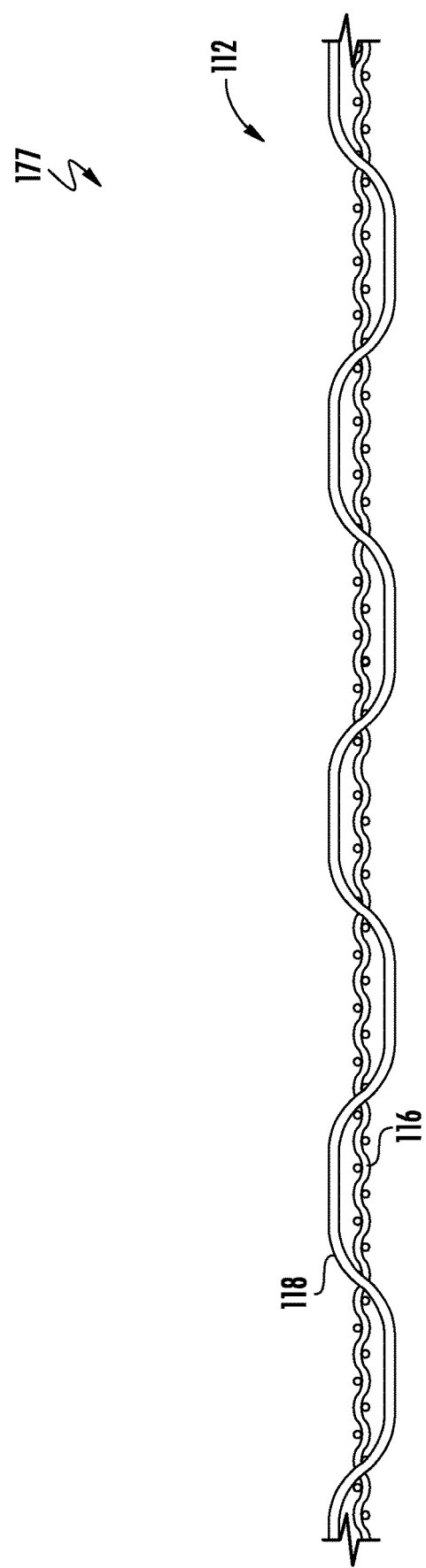
FIG. 5 illustrates an example of a conductive thread in accordance with example embodiments of the present disclosure.

FIG. 5 illustrates an example 177 of a conductive line in accordance with one or more embodiments. In example 177, conductive line 112 is a conductive thread. The conductive thread includes a conductive wire 116 that is combined with one or more flexible threads 118. Conductive wire 116 may be combined with flexible threads 118 in a variety of different ways, such as by twisting flexible threads 118 with conductive wire 116, wrapping flexible threads 118 with conductive wire 116, braiding or weaving flexible threads 118 to form a cover that covers conductive wire 116, and so forth. Conductive wire 116 may be implemented using a variety of different conductive materials, such as copper, silver, gold, aluminum, or other materials coated with a conductive polymer. Flexible thread 118 may be implemented as any type of flexible thread or fiber, such as cotton, wool, silk, nylon, polyester, and so forth.

Combining conductive wire 116 with flexible thread 118 causes conductive line 112 to be flexible and stretchy, which enables conductive line 112 to be easily woven with one or more non-conductive lines 110 (e.g., cotton, silk, or polyester) to form outer cover 104. Alternately, in at least some implementations, outer cover 104 can be formed using only conductive lines 112.

Figure 6:
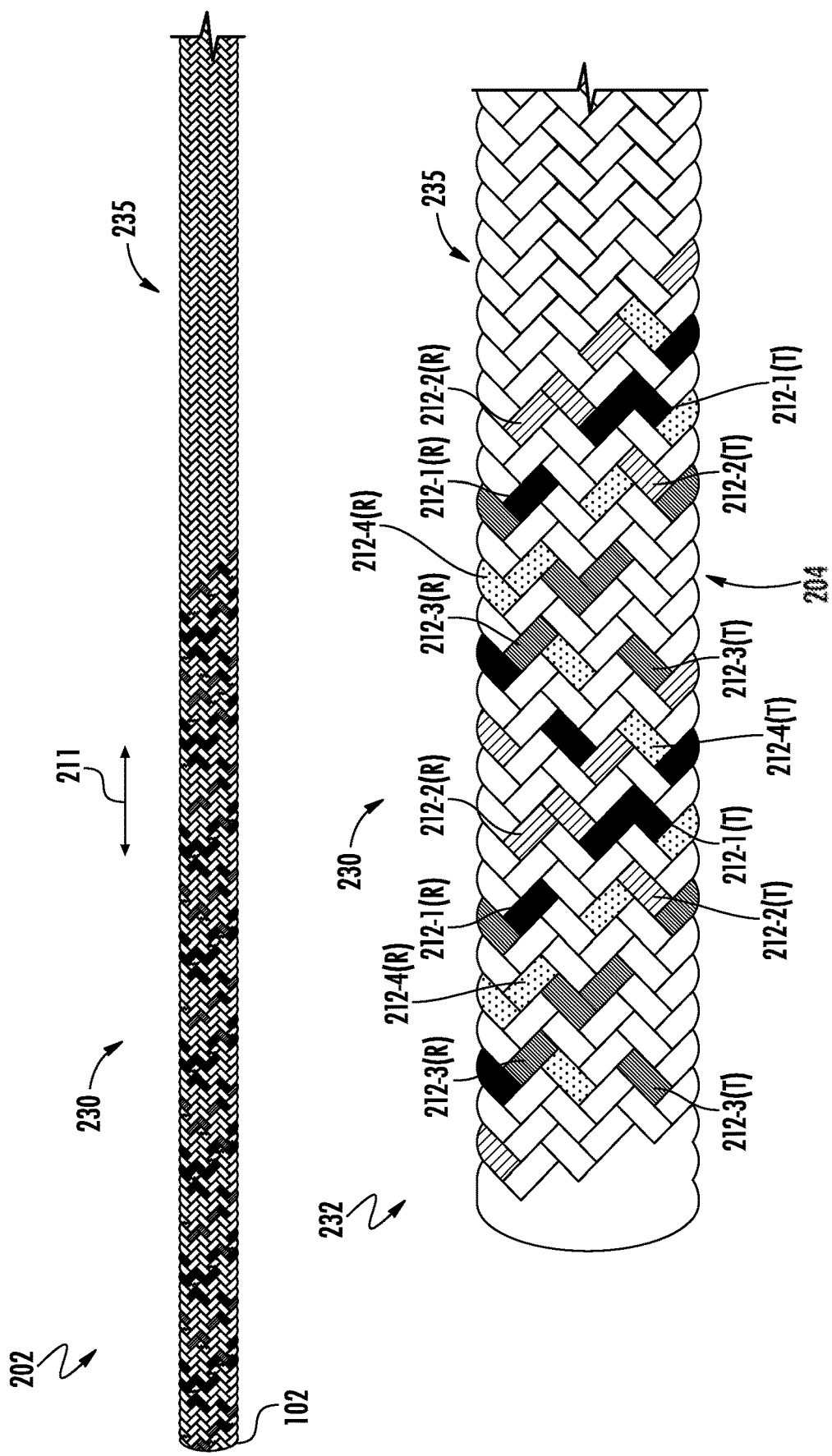
FIG. 6 illustrates an example of an interactive cord including a touch-sensitive area and a non-touch-sensitive area in accordance with example embodiments of the present disclosure.

FIG. 6 illustrates an example 202 of an interactive cord 102 in accordance with example embodiments of the present disclosure. In example 202, interactive cord 102 includes a touch-sensitive area 230 adjacent to anon-touch-sensitive area 235. Interactive cord 202 defines a longitudinal direction 211 along its length. Interactive cord 102 includes a plurality of conductive lines implemented as a plurality of conductive threads 212. Interactive cord 102 includes a plurality of non-conductive lines implemented as a plurality of non-conductive threads 210. Conductive threads 212 are selectively braided with the non-conductive threads 210 using two or more thread patterns to selectively define touch-sensitive area 230 for the interactive cord 102. One or more first braiding patterns may be used to form a touch-sensitive area 230 corresponding to a first longitudinal portion of the interactive cord. At the touch-sensitive area 230, conductive threads 212 are selectively exposed at the outer cover 204 of the cord to facilitate the detection of touch input a from capacitive touch points. One or more second braiding patterns can be used to form a non-touch-sensitive area 235 at a second longitudinal portion of the interactive cord 102.

The outer cover 204 may be formed by braiding conductive threads 212 with a first subset of non-conductive threads 210 at the first longitudinal portion of the interactive cord corresponding to the touch-sensitive area 230. The inner core (not shown) of the interactive cord may include a second subset of non-conductive lines at the first longitudinal portion. Optionally, the inner core may also include additional conductive lines that are not exposed at the touch-sensitive area. The second subset of non-conductive lines sensitive may or may not be braided within the inner core at the non-touch-sensitive area. At a second longitudinal portion of the interactive cord corresponding to the non-touch-sensitive area 235, the plurality of conductive threads 212 can be positioned within the inner core such that one or more of the non-conductive threads provide separation to inhibit the conductive threads from detecting touch due to capacitive coupling.

The outer cover at the second longitudinal portion can be formed by braiding the first subset of non-conductive threads and one or more additional non-conductive threads. For instance, one or more of the second subset of non-conductive threads can be routed to the outer cover at the second longitudinal portion and braided with the first subset of the non-conductive threads. In this manner, the interactive cord may include a uniform braiding appearance while using multiple braiding patterns to selectively form touch-sensitive areas. For example, the number of additional non-conductive threads braided with the first subset of non-conductive threads can be equal to the number of conductive threads such that the braiding pattern will appear to be uniform in both the touch-sensitive area 230 and non-touch-sensitive area 235. It is noted that the coloring or pattern of the individual conductive threads shown in FIG. 6 is optional. For example, the conductive threads may be formed with the same color thread as the non-conductive threads such that the interactive cord will have a uniform colored appearance across its entirety.

Within the touch-sensitive area 230, the braiding pattern of outer cover 204 exposes conductive threads 212 at capacitive touchpoints 208 along outer cover 204. Conductive threads 212 are covered and hidden from view at other areas of cover 204 due to the braiding pattern. Touch input to any of capacitive touchpoints 208 causes a change in capacitance to corresponding conductive thread(s) 212, which may be detected by sensing circuitry 182. However, touch input to other areas of outer cover 204 formed by non-conductive threads 210 does not cause a change (or a significant change) in capacitance to conductive threads 212 that is detected as an input. At the non-touch-sensitive area 235, the conductive threads can be formed within the inner core (not shown) such that touch within the non-touch-sensitive area 235 is not registered as an input.

As illustrated in the close-up view 232 of FIG. 6, the plurality of conductive threads 212 can include threads of different types of electrodes that form capacitive sensors that use a mutual capacitance sensing technique. For example, a first group of conductive threads can form transmitter threads 212-1(T), 212-2(T), 212-3(T), and 212-4(T) and a second group of the conductive threads can form receiver threads 212-1(R), 212-2(R), 212-3(R), and 212-4(R). The transmitter threads work as the transmitters of the capacitive sensors, while the receiver threads work as the receivers of the capacitive sensors. The touch sensor can be configured as a grid having rows and columns of conductors that are exposed in the outer cover that the form capacitive touch points 208. In a mutual-capacitance sensing technique, the transmitter threads are configured as driving lines, which carry current, and the receiver threads are configured as sensing lines, which detect capacitance at nodes inherently formed in the grid at each intersection.

For example, proximity of an object close to or at the surface of the outer cover 204 that includes capacitive touchpoints 208 may cause a change in a local electrostatic field, which reduces the mutual capacitance at that location. The capacitance change at every individual node on the grid may thus be detected to determine "where" the object is located by measuring the voltage in the other axis. For example, a touch at or near a capacitive touchpoint may decrease the distance between a pair of transmitter and receiver lines, thereby causing a detectable change in capacitance at one or more of the transmitter and receiver lines.

In the example of FIG. 6, the outer cover 204 is formed by braiding conductive threads in opposite circumferential directions using so-called "S" threads and "Z" threads. A first group of one or more S threads can be wrapped in a first circumferential direction (e.g., clockwise) around the interactive cord and a second group of one or more Z threads can be wrapped in a second circumferential direction (e.g., counterclockwise) around the interactive cord at a longitudinal portion of the interactive cord including a touch sensor. In this particular example, a set of four S threads are utilized to form the transmitter threads 212-1(T), 212-2(T), 212-3(T), and 212-4(T) and a set of four Z threads are utilized to form the receiver threads 212-1(R), 212-2(R), 212-3(R), and 212-4(R). The S transmitter threads 212-1(T), 212-2(T), 212-3(T), and 212-4(T) are wrapped circumferentially in the clockwise direction. The Z receiver threads 212-1(R), 212-2(R), 212-3(R), and 212-4(R) are wrapped circumferentially in the counterclockwise direction. It is noted that the transmitter threads may be wrapped circumferentially in the counterclockwise direction as Z threads and the receiver threads may be wrapped circumferentially in the clockwise direction as S threads in an alternative embodiment. Moreover, it is noted that the use of four transmitter threads and four receiver threads is provided by way of example only. Any number of conductive threads may be utilized.

The S conductive threads and Z conductive threads cross each other to form capacitive touch points 208. In some examples, the equivalent of a touchpad on the outer cover of the interactive cord 102 can be created. A mutual capacitance sensing technique can be used whereby one of the groups of S or Z threads are configured as transmitters of the capacitive sensor while the other group of S or Z threads are configured as receivers of the capacitive sensor. When a user's finger touches or is in proximity to an intersection of a pair of the Z and S threads, the location of the touch can be detected from the mutual capacitance sensor that includes the pair of transmitter and receiver conductive threads. Controller 117 can be configured to detect the location of a touch input in such examples by detecting which transmitter and/or receiver thread is touched. For example, the controller can distinguish a touch to a first transmitter conductive thread (e.g., 212-1(T)) from a touch to a second transmitter conductive thread 212-2(T), third transmitter conductive thread 212-3(T), or a fourth transmitter conductive thread 212-(T). Similarly, the controller can distinguish a touch to a first receiver thread (e.g., 212-1(R)) from a touch to a second receiver thread 212-2(R), third receiver thread 212-4(R), or a fourth receiver thread 212-4(R). In this example, sixteen distinct types of capacitive touch points can be formed based on different pairs of S and Z threads. As will be described hereinafter, a non-repetitive braiding pattern can be used to provide additional detectable inputs in some examples. For example, the braiding pattern can be changed to provide different sequences of capacitive touchpoints that can be detected by the controller 117.

Additionally and/or alternatively, a braiding pattern can be used to expose the conductive threads for attachment to device pins or contact pads for an internal electronics module or other circuitry. For example, a particular braiding pattern may be used that brings the conductive threads to the surface of the interactive cord where the conductive threads can be accessed and attached to various electronics. The conductive threads can be aligned at the surface for easy connectorization.

Figure 7:
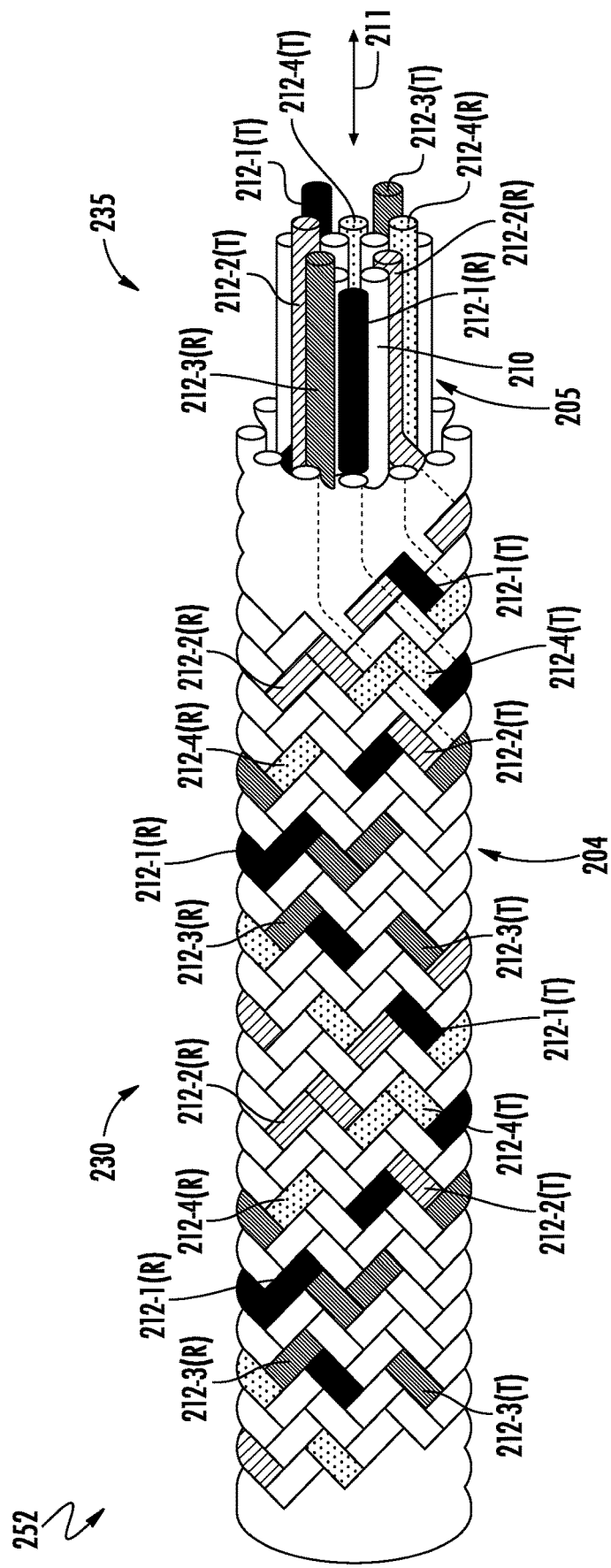
FIG. 7 illustrates an example of an interactive cord including an outer cover and an inner core in accordance with example embodiments of the present disclosure.

FIG. 7 illustrates an additional example 252 of an interactive cord 102, depicting the outer cover 204 at the touch-sensitive area 230, and the inner core 205 at non-touch-sensitive area 235. At touch-sensitive area 230, conductive threads 212-1(T), 212-2(T), 212-3(T), 212-4(T), 212-1(R), 212-2(R), 212-3(R), and 212-4(R) are braided with a first subset of non-conductive threads 210 to form the outer cover 204 at the touch-sensitive area 230. At the touch-sensitive area 230, the conductive threads are selectively exposed on the outer cover to form capacitive touch points 208 for the capacitive touch sensor. A first braiding pattern may be used to form the outer cover at the touch-sensitive area 230 so as to expose portions of the conductive threads.

At the non-touch-sensitive area 235, the conductive threads are routed to the inner core 205 of the interactive cord 102. The inner core 205 is illustrated in a cutout view where the outer cover has been removed for illustrative purposes. As illustrated, each conductive threads 212-1(T), 212-2(T), 212-3(T), 212-4(T), 212-1(R), 212-2(R), 212-3(R), and 212-4(R) is positioned within the inner core. Additionally, some non-conductive threads are positioned within the inner core to provide separation between individual ones of the conductive threads within the inner core. Although not shown, the outer cover 204 at the non-touch-sensitive area 235 can be formed by braiding the first subset of non-conductive threads with an additional subset of non-conductive threads so a uniform braiding pattern appearance is achieved.

Various braiding processes can be used to controllably braid the conductive threads to selectively form touch-sensitive area 230 for interactive cord 102. A lace-braiding process can be used in some embodiments, such as a bobbin-lace-braiding process, also referred to as torchon-lace-braiding process. In a bobbin-lace-braiding process, a plurality of flexible lines (e.g., conductive threads and non-conductive threads) can be provided on a plurality of individually-controllable bobbins. A computer-controlled process can be applied to control the bobbins and thereby braid the plurality of flexible threads using a plurality of different braiding patterns to selectively form a touch-sensitive area for a capacitive touch sensor. For instance, a first braiding pattern may be applied to form touch-sensitive area 230 by braiding one or more conductive thread 212 with one or more non-conductive threads 210 to form the outer cover 204 at a first longitudinal portion of the interactive cord for touch-sensitive area 230. A second braiding pattern may be applied to form a non-touch-sensitive area 235 by braiding only non-conductive threads 210 to form the outer cover 204 at a second longitudinal portion of the interactive cord. The second braiding pattern may position the conductive threads at the inner core 205 of the interactive cord. The conductive threads may be braided or unbraided within the inner core 205. The non-conductive threads that are braided to form the outer cover 204 at the non-touch-sensitive area provide a separation distance between the the conductive threads 212 and an external touch. A uniform braiding appearance can be provided by utilizing a total number of non-conductive threads 210 and conductive threads 212 to form the outer cover at the first longitudinal portion that is equal to a total number of non-conductive threads 210 used to form the outer cover 204 at the second longitudinal portion for the non-touch-sensitive area 235.

It is noted that the braiding pattern of the conductive threads can be varied within a touch-sensitive area or for different touch-sensitive areas. Referring back to FIG. 5, the transmitter conductive threads are formed using a first repeating thread order (left to right in the longitudinal direction of the interactive cord 102): 212-4(T), 212-3(T), 212-2(T), and 212-1(T). The receiver conductive threads are formed in a second repeating thread order: 212-1(R), 212-2(R), 212-3(R), 212-4(R). Together the order of braiding the conductive threads defines a first braiding pattern.

A second braiding pattern is shown in FIG. 6. The transmitter conductive threads are formed in a third repeating thread order: 212-1(T), 212-3(T), 212-2(T), 212-4(T). The receiver conductive threads are formed in a fourth repeating thread order: 212-1(R), 212-4(R), 212-2(R), 212-3(R). Together the order of braiding the transmitter and receiver threads defines a second braiding pattern.

Figure 8:
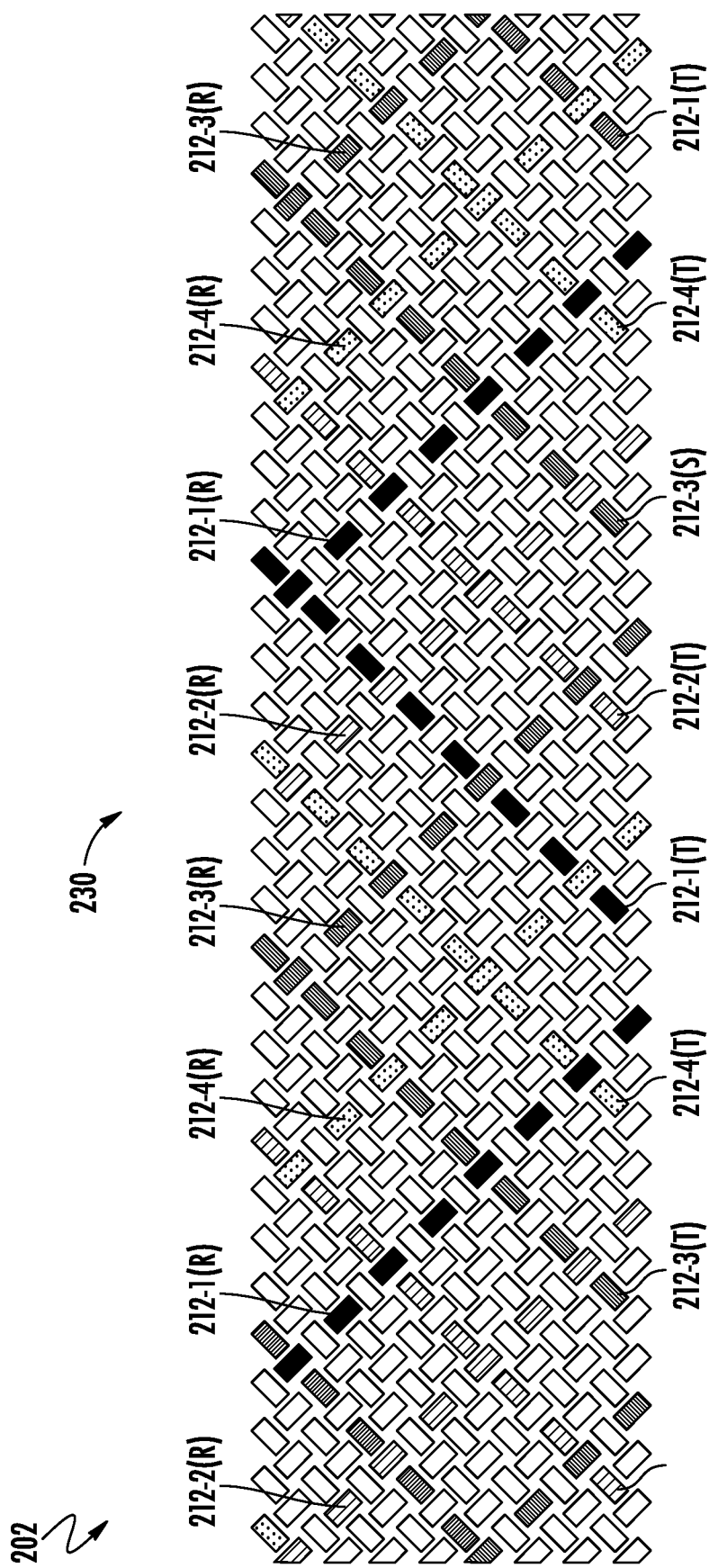
FIG. 8 illustrates an example of an interactive cord including transmitter lines and receiver lines braided in opposite directions in accordance with example embodiments of the present disclosure.

FIG. 8 illustrates a third example 262 of an interactive cord 102 including a touch-sensitive area 230. In example 262, interactive cord 102 includes at least one substantially flat or planar surface. Multiple braiding patterns can be used to form such an interactive cord to achieve selective touch-sensitive areas, as well as to define non-repetitive patterns for detecting touch inputs. In FIG. 8, a third braiding pattern is illustrated. In this example, the transmitter conductive threads are formed using a fifth repeating thread pattern: 212-1(T), 212-2(T), 212-3(T), 212-4(T). The receiver conductive threads are formed using a sixth repeating thread pattern: 212-4(R), 212-3(R), 212-2(R), 212-1(R). Together the order of braiding the transmitter and receiver conductive threads defines a third braiding pattern.

Figure 9:
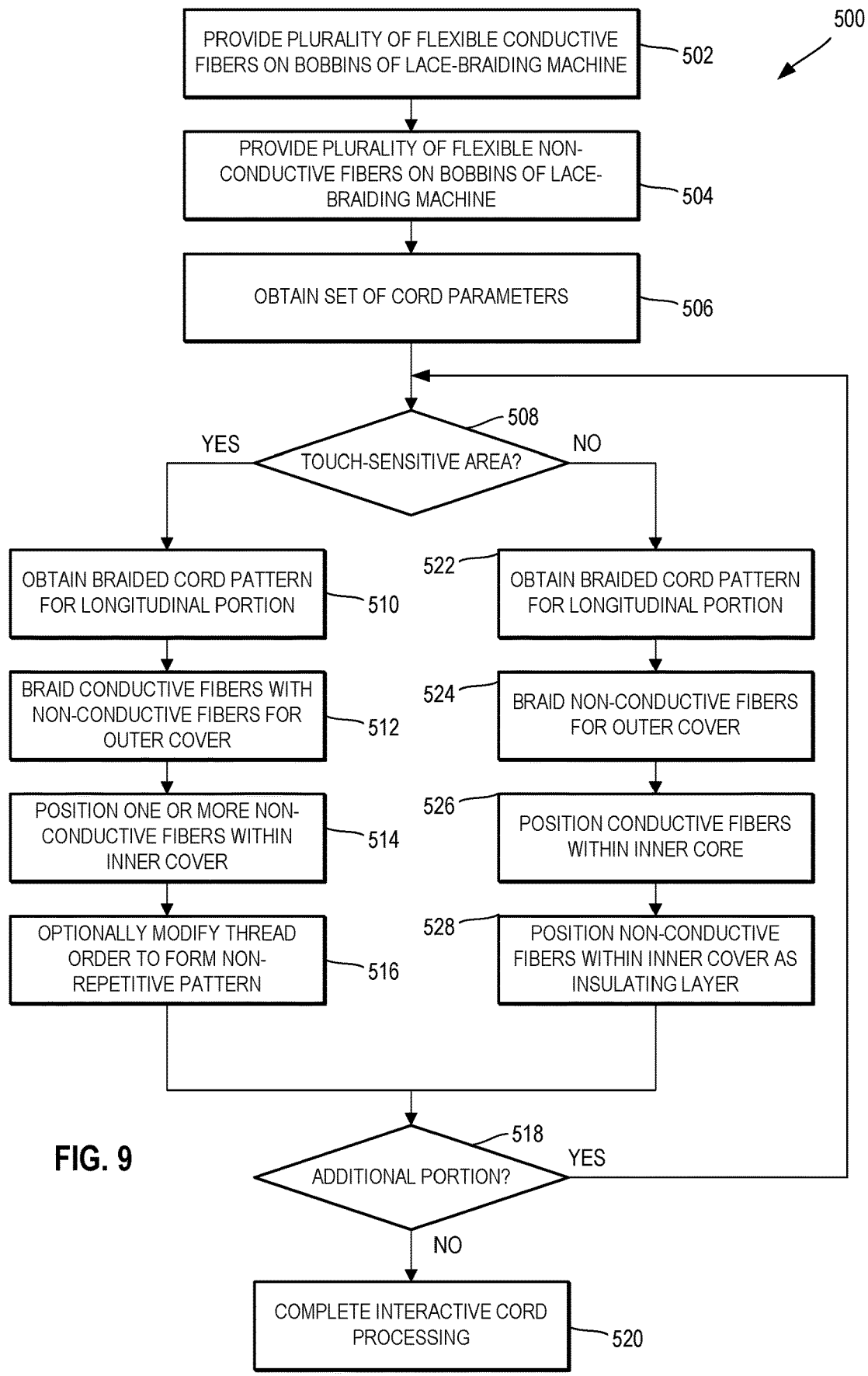
FIG. 9 is a flowchart illustrating an example method of manufacturing an interactive cord in accordance with example embodiments of the present disclosure.

Various approaches for forming interactive cords that include selectively formed touch-sensitive area(s) in accordance with example embodiments are described. FIG. 9 is a flowchart depicting an example method 500 of manufacturing an interactive cord that includes a touch-sensitive area that forms a capacitive touch sensor in accordance with example embodiments. Although FIG. 9 depicts steps performed in a particular order for purposes of illustration and discussion, method 500 of FIG. 9 and the other methods (e.g., method 800 of FIG. 14) described herein are not limited to the particularly illustrated order or arrangement. The various steps of the methods disclosed herein can be omitted, rearranged, combined, and/or adapted in various ways without deviating from the scope of the present disclosure.

Figure 17:
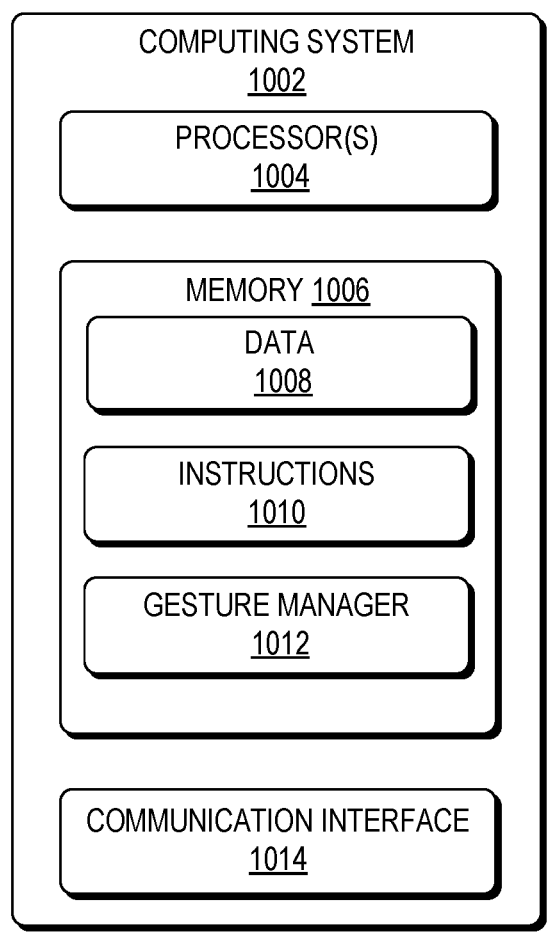
FIG. 17 illustrates a block diagram of an example computing system that can be used to implement any type of computing device as described herein.

One or more portions of method 500 can be implemented by one or more computing devices such as, for example, one or more computing devices of a computing system 1002 as illustrated in FIG. 17. One or more portions of method 500 can be implemented as an algorithm on the hardware components of the devices described herein to, for example, control a lace-braiding machine such as bobbin-lace braiding machine. In example embodiments, method 500 may be performed by braiding control system implemented using one or more computing devices of a computing system (e.g., 1002).

At (502), a plurality of flexible conductive lines can be provided on a plurality of bobbins of a lace-braiding machine. The conductive lines may be conductive threads, fibers, yarns, fiber optics, and other conductive materials. For example, conductive lines such as conductive threads can be used to form a capacitive touch sensor that is configured to detect touch-input.

At (504), a plurality of flexible non-conductive lines is provided on a second plurality of bobbins of the lace-braiding machine. The non-conductive lines may include non-conductive threads, fibers, yarns, or any other suitable flexible material having a substantially non-conductive property. It is noted that the operations at (502) and (504) may be performed by one or more human operators or machines in some examples.

At (506), a set of cord parameters for the interactive cord is obtained. For example, one or more files, instructions, or other suitable computer readable input may be used to provide a set of cord parameters that define one or more braiding patterns for a lace braiding machine. The cord parameters may be used by a lace braiding control system to control the lace braiding machine. In some examples, a set of cord parameters defines multiple braided cord patterns for forming the interactive cord. For example, the set of cord parameters may include one or more first patterns for forming a touch-sensitive area of the interactive cord and one or more second patterns for forming a non-touch-sensitive area of the interactive cord.

At (508), it is determined whether a touch-sensitive area of the interactive cord is to be formed. For example, a lace braiding control system may access a cord braiding pattern for a first longitudinal portion of the interactive cord to determine whether it is a touch-sensitive area.

If it is determined that a touch-sensitive area is to be formed for the interactive cord, method (500) proceeds to (510). At (510), a first braided cord pattern for the longitudinal portion of the interactive cord is obtained. The first braided cord pattern obtained at 510 may be included within the set of cord parameters.

At (512), one or more conductive lines are braided with a first subset of non-conductive lines to form the outer cover at the first longitudinal portion of the interactive cord. At (514), a second subset of non-conductive lines is positioned within the inner core of the interactive cord. It is noted that the operations at (512) and (514) can be performed simultaneously. For example, the lace braiding machine may braid the one or more conductive lines with the first subset of non-conductive lines while positioning the second subset of one or more non-conductive lines within the inner core. In some examples, the second subset of non-conductive lines can be braided within the inner core. In other examples, the second subset of non-conductive lines is not braided within the inner core. For example, the non-conductive lines of the second subset may extend in the longitudinal direction parallel to one another within the inner core which is surrounded by the outer cover.

At (516), the thread order is optionally modified to form a non-repetitive braided cord pattern. For example, the lace-braiding system may determine from the cord parameters that the longitudinal portion is to include a non-repetitive braiding pattern by forming such longitudinal portion with a variable order of conductive threads. By way of example, a non-repetitive braiding pattern may be provided by braiding multiple conductive threads in a first order to form a first sequence of capacitive touch points and braiding the set of conductive threads in a second order to form a second sequence of capacitive touch points. In another example, the first braiding order may include a first subset of conductive threads and a second order may include a second subset of conductive threads. For example, the second subset of conductive threads may include the first subset of conductive threads and additional conductive threads.

After completing the braided cord pattern for the longitudinal portion, method (500) proceeds at (518). At (518), it is determined whether an additional longitudinal portion of the interactive cord is to be formed. If an additional longitudinal portion is to be formed, method (500) proceeds to (508) to determine whether the next longitudinal portion is a touch-sensitive area or a non-touch-sensitive area.

If it is determined that a non-touch-sensitive area is to be braided at (508), method (500) proceeds at (522). At (522), a braided cord pattern for the longitudinal portion of the non-touch-sensitive area is obtained. At (524), one or more non-conductive lines are braided to form the outer cover of the interactive cord at the longitudinal portion for the non-touch-sensitive area. At (526), the plurality of conductive threads of the interactive cord are positioned within the inner core. At (528), one or more non-conductive threads are positioned within the inner core as an insulating layer. It is noted that the operations at (524), (526), and (528) can be performed simultaneously in some examples. For example, while braiding the one or more non-conductive lines to form the outer cover at (524), the lace braiding machine may position the conductive lines within the inner core at (526) and position the one or more non-conductive lines within the inner core at (528).

According to some implementations, a uniform braiding appearance may be provided while modifying the braiding pattern for individual longitudinal portions of the interactive cord to form touch-sensitive areas and non-touch-sensitive areas. For example, one or more conductive threads can be braided with a first number of non-conductive threads to form the outer cover at (512). A second number of non-conductive threads can be braided to form the outer cover at (524). The second number of non-conductive threads can be equal to the sum of the first number of non-conductive threads and the number of one or more conductive threads braided with the first number of non-conductive threads at (512). In this manner, the outer cover can be formed using a constant number of threads while varying the number of conductive threads and the number of non-conductive threads.

If an additional longitudinal portion is not to be braided for the interactive cord, method (500) continues at (520). In some examples, method (500) can continue by performing further operations to complete the interactive cord, such as by attaching an internal electronics module to the individual conductive filaments, etc.

Figure 10:
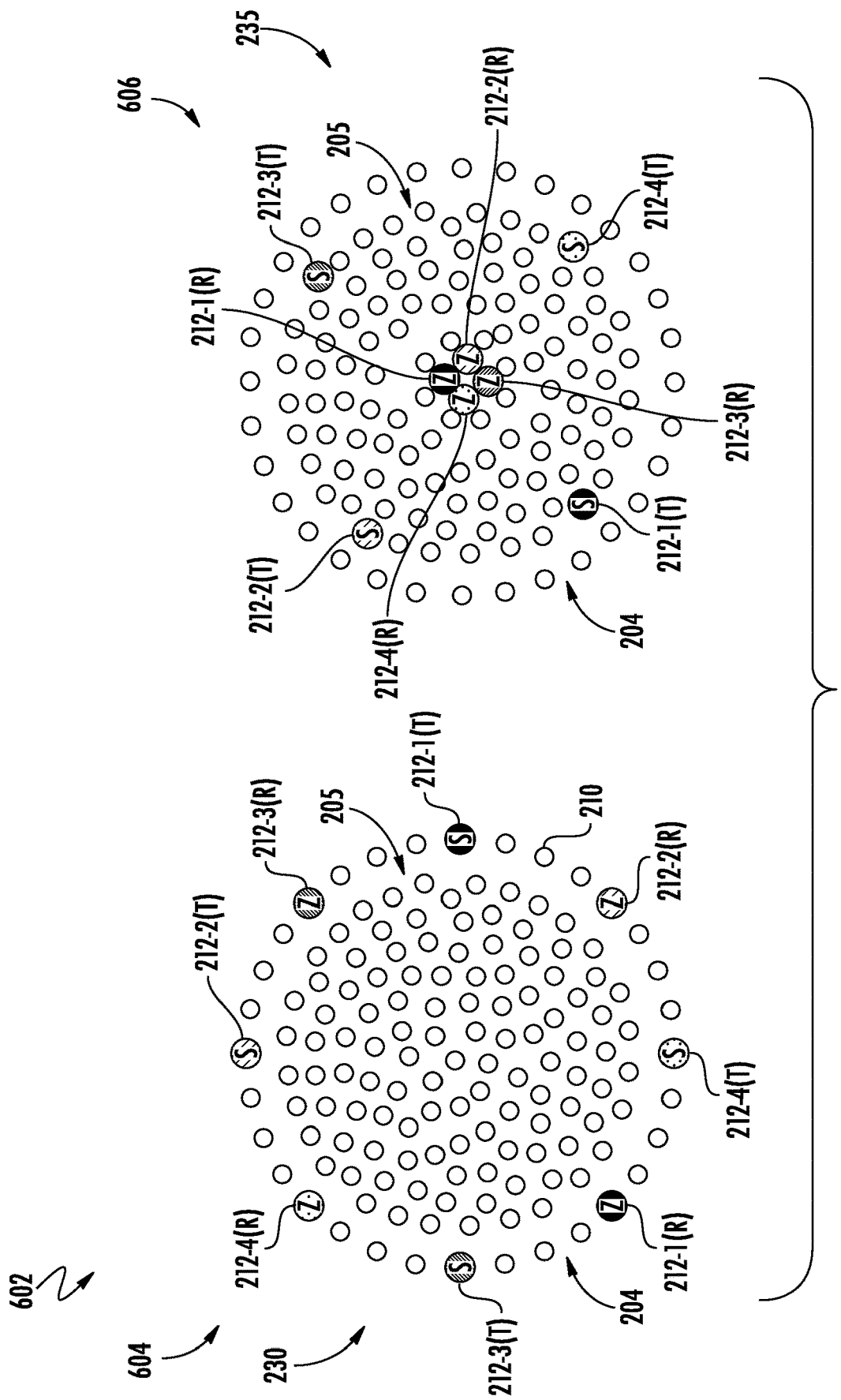
FIG. 10 illustrates an example of an interactive cord depicting additional details of an inner core in accordance with example embodiments of the present disclosure.

In some implementations, the transmitter (e.g., S threads) conductive threads and the receiver (e.g., Z threads) conductive threads of an interactive cord can be positioned within the inner core at one or more longitudinal portions corresponding to a non-touch-sensitive area. FIG. 10 depicts an example 602 of interactive cord 102 including touch-sensitive area 230 and non-touch-sensitive area 235. FIG. 10 depicts cross-sectional views 604 and 606 depicting the touch-sensitive area 230 and the non-touch-sensitive area 235, respectively.

At the non-touch-sensitive area 235, conductive threads 212 can be separated from external touch by one or more non-conductive threads 210 formed in outer cover 204 at the one or more longitudinal portions. Within the inner core 205, the transmitter conductive threads can be separated from the receiver conductive threads using additional non-conductive threads. The separation can decrease the baseline mutual capacitance of the transmitter/receiver pairs. For example, the transmitter conductive threads 212-1(T), 212-2(T), 212-3(T), 212-4(T) can be grouped together in a first cluster of conductive threads within the inner core 205. The receiver conductive threads 212-1(R), 212-2(R), 212-3(R), 212-4(R) can be grouped as a second cluster of conductive threads within the inner core 205. The transmitter conductive threads can be separated from the receiver conductive threads within the inner core at the one or more longitudinal portions corresponding to the non-touch-sensitive areas. One or more additional non-conductive threads 210 within the inner core can be positioned between the transmitter and receiver conductive threads to provide separation between the two clusters in a radial direction 612 of the interactive cord 102.

Figure 11:
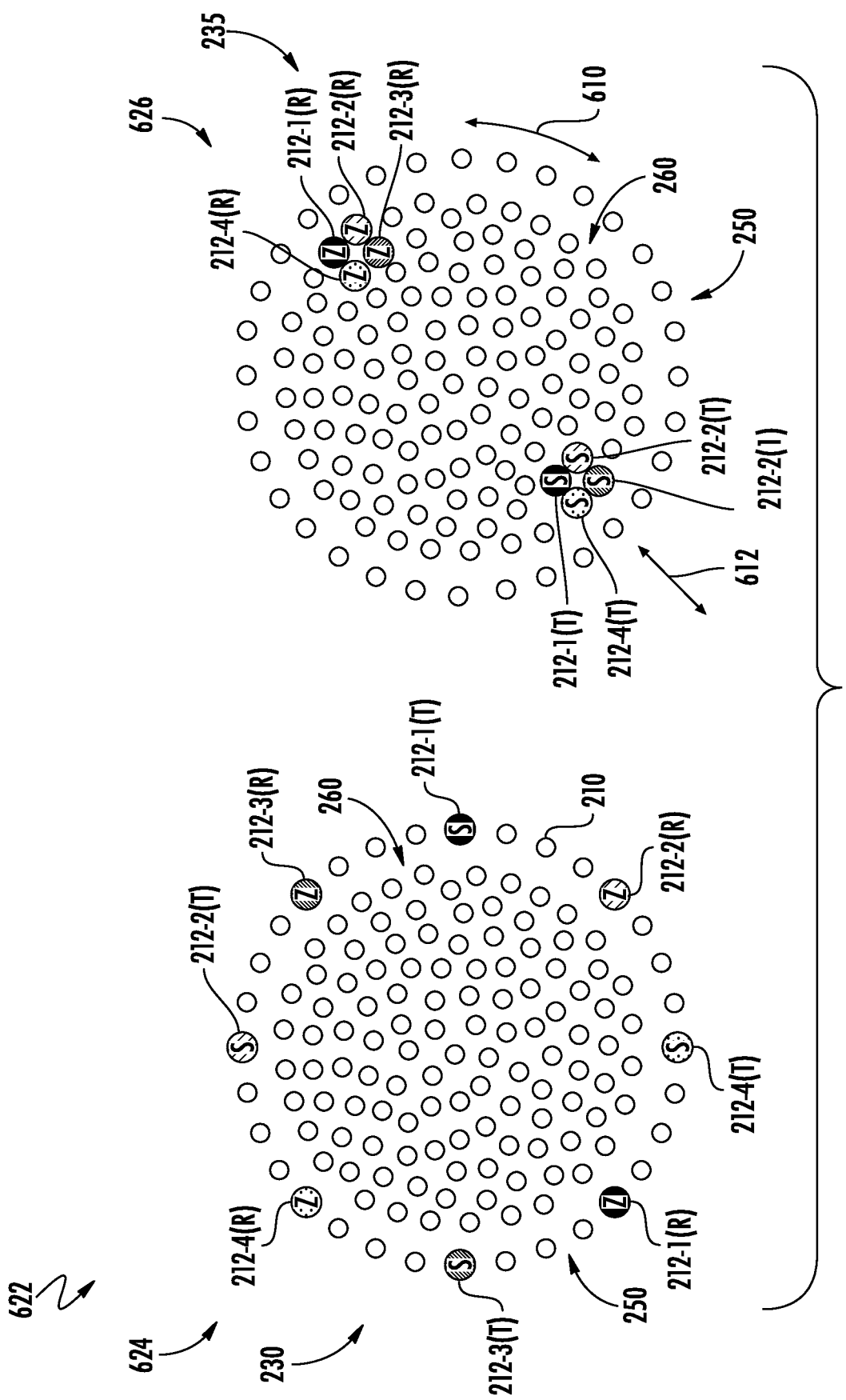
FIG. 11 illustrates an example of an interactive cord depicting additional details of an inner core in accordance with example embodiments of the present disclosure.

FIG. 11 depicts an example 622 of an interactive cord 102 including a touch-sensitive area 230 and a non-touch-sensitive area 235 in accordance with another example embodiment. FIG. 11 depicts cross-sectional views 624 and 626 depicting the touch-sensitive area 230 and the non-touch-sensitive area 235, respectively.

Similar to FIG. 10, non-conductive threads 210 are braided to form the outer cover 204. Within the inner core 205, the transmitter conductive threads can be separated from the receiver conductive threads through a radial and circumferential spacing of the conductive threads. For example, the transmitter conductive threads can be grouped together as a first cluster of conductive threads within the inner core 205. The transmitter conductive threads can be clustered at the center of the inner core within the interactive cord in some examples. The receiver conductive threads 212-1(R), 212-2(R), 212-3(R), 212-4(R) can be spaced apart from the transmitter conductive threads 212-1(T), 212-2(T), 212-3(T), 212-4(T) in the radial direction 612 of the interactive cord. For example, the receiver conductive threads can be formed in an outer portion of the inner core 205 with each receiver conductive thread being spaced apart from other receiver conductive threads in a circumferential direction 610 of the interactive cord. One or more non-conductive threads can be positioned between the receiver conductive threads in the circumferential direction. One or more additional non-conductive threads can be positioned between the receiver conductive threads and the cluster of transmitter conductive threads. The separation of transmitter and receiver threads can decrease the baseline mutual capacitance of pairs of transmitters and receivers. Such separation helps reduce changes in mutual capacitance of the pairs due to external touch.

Figure 12:
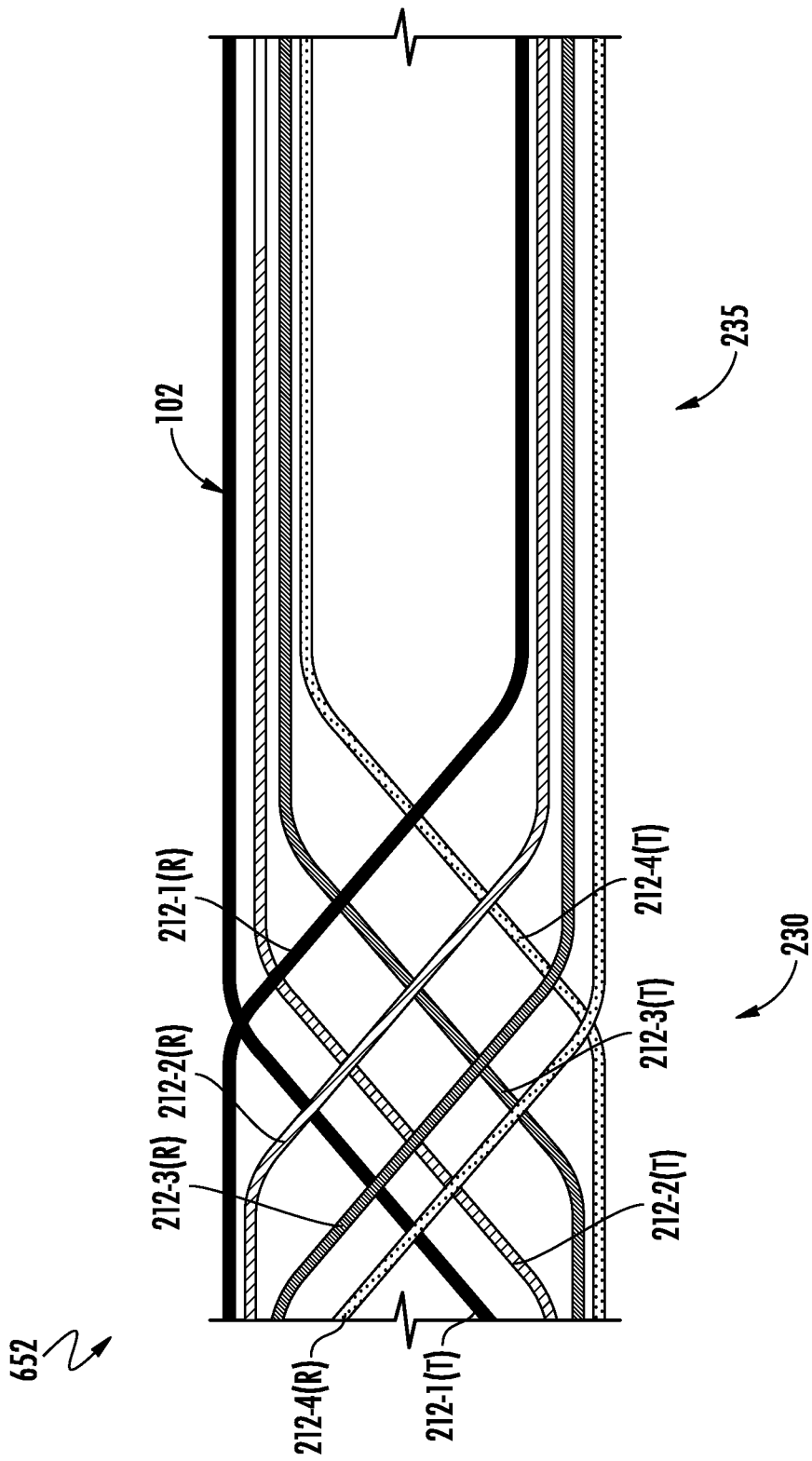
FIG. 12 illustrates an example of an interactive cord including a non-touch-sensitive area and a touch-sensitive area in accordance with example embodiments of the present disclosure.

FIG. 12 depicts another example 652 of an interactive cord 102 including a touch-sensitive area 230 and a non-touch-sensitive area 235. Example 652 illustrates an interactive cord 102 having a substantially planar or flat portion upon which the touch-sensitive area 230 and a non-touch-sensitive area 235 are formed. In this example, touch-sensitive area 230 is formed by braiding a set of transmitter threads 212-1(T), 212-2(T), 212-3(T), 212-4(T) with a set of receiver threads 212-1(R), 212-2(R), 212-3(R), 212-4(R) to form a plurality of capacitive touch points at the intersections of each of the thread types. The non-touch-sensitive area 235 is formed by separating the set of transmitter threads from the set of receiver threads within the outer cover 204. As illustrated, each of the receiver threads is routed to a lower portion (with respect to the drawing) of the outer cover of the interactive cord 102 and each of the transmitter threads is routed to an upper portion of the outer cover of the interactive cord 102. The set of transmitter threads may be separated from the set of receiver threads by one or more non-conductive threads (not shown). In this manner, insulation can be provided between the set sets of conductive threads such that the non-touch-sensitive area 235 is formed.

In accordance with some implementations, a non-repetitive pattern of capacitive touch points can be formed on the outer cover of an interactive cord. A non-repetitive pattern of capacitive touch points can have various uses in accordance with example implementations. For instance, a non-repetitive braiding pattern may allow additional discrete inputs to be detected with the interactive cord. In other examples, a non-repetitive braiding pattern may be used to determine a more precise location of a touch to the interactive cord. Additionally, a non-repetitive braiding pattern may be used to provide authentication. For example, a non-repetitive braiding pattern may provide a code that can be determined by user swiping or providing another input along the longitudinal link of an interactive cord.

Figure 13:
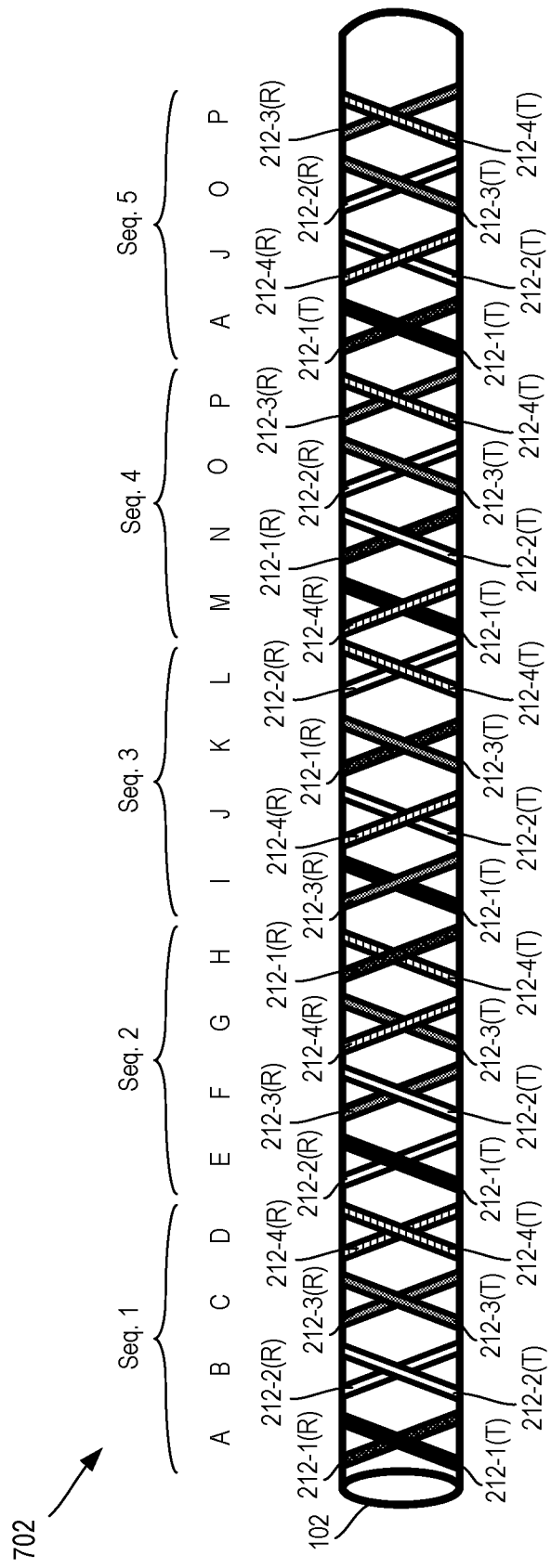
FIG. 13 illustrates an example of an interactive cord including a non-repetitive braided pattern in accordance with example embodiments of the present disclosure.

FIG. 13 depicts an example 702 of an interactive cord 102 having a non-repetitive braiding pattern. The outer cover 204 of the interactive cord 102 is formed by braiding a plurality of conductive threads with a plurality of non-conductive threads (not shown). In this example, the conductive threads are braided within a single touch-sensitive area using a non-repetitive braiding pattern to form individually-detectable sequences of capacitive touch points.

By way of example, four transmitter conductive threads can be wrapped around the interactive cord in a first direction and four receiver conductive threads can be wrapped around the interactive cord in a second direction as earlier described. A coded pattern can be created by changing the braiding pattern of the conductive threads.

For example, each of the four transmitter conductive threads can be a transmitter conductive threads 212-1(T), 212-2(T), 212-3(T), 212-4(T). Each of the four receiver conductive threads can be a receiver conductive thread 212-1(R), 212-2(R), 212-3(R), 212-4(R). A capacitive touch point formed by a corresponding transmitter conductive thread 212-1(T) and receiver conductive thread 212-1(R) is labeled 'A', a capacitive touch point formed by a transmitter conductive thread 212-2(T) and receiver conductive threads 212-2(R) is labeled 'B', a capacitive touch point formed by a transmitter conductive thread 212-3(T) and receiver conductive thread 212-3(R) is labeled 'C', and a capacitive touch point formed by a transmitter conductive thread 212-4(T) and receiver conductive thread 212-4(R) is labeled 'D. A capacitive touch point formed by a transmitter conductive thread 212-1(R) and receiver conductive thread 212-2(R) is labeled 'E'. A capacitive touch point formed by a transmitter conductive thread 212-2(T) and receiver conductive thread 212-3(R) is labeled 'F', a capacitive touch point formed by a transmitter conductive thread 212-3(T) and receiver conductive thread 212-4(R) is labeled 'G', and a capacitive touch point formed by a transmitter conductive thread 212-4(T) and receiver conductive thread 212-1(R) is labeled 'H.' A capacitive touch point formed by a transmitter conductive thread 212-1(T) and receiver conductive thread 212-3(R) is labeled 'I'. A capacitive touch point formed by a transmitter conductive thread 212-2(T) and receiver conductive thread 212-4(R) is labeled 'J'. A capacitive touch point formed by a transmitter conductive thread 212-3(T) and receiver conductive thread 212-1(R) is labeled 'K'. A capacitive touch point formed by a transmitter conductive thread 212-4(T) and receiver conductive thread 212-1(R) is labeled 'L'. A capacitive touch point formed by a transmitter conductive thread 212-1(T) and receiver conductive thread 212-4(R) is labeled 'M'. A capacitive touch point formed by a transmitter conductive thread 212-2(T) and receiver conductive thread 212-1(R) is labeled 'N'. A capacitive touch point formed by a transmitter conductive thread 212-3(T) and receiver conductive thread 212-2(R) is labeled 'O'. A capacitive touch point formed by a transmitter conductive thread 212-4(T) and receiver conductive thread 212-3(R) is labeled 'P'.

The pattern by which the capacitive touch points are formed due to the braiding process can be varied to create a coded pattern. For instance, the threads may be braided to form a non-repetitive pattern at the outer cover. In example 702, multiple coded sequences can be formed using a pair of four transmitter and four receiver threads to form a non-repetitive pattern of capacitive touchpoints. A first sequence Seq1 includes capacitive touch points A, B, C, D. As illustrated, this can be formed by braiding the set of transmitter conductive threads in an order 212-1(T), 212-2(T), 212-3(T), 212-4(T) and braiding the set of receiver conductive threads in an order 212-1(R), 212-2(R), 212-3(R), 212-4(R).

A user's touch to each of the capacitive touch points A, B, C, D in order or at the same time can indicate the first sequence Seq1. In some examples, the controller can determine a first function mapped to the first sequence Seq1 from a table or other data store indicating functions assigned to particular sequences. The first sequence Seq1 can be mapped to a first function of the computing device, for example. In some examples, the controller can determine a location of the interactive cord corresponding to where the touch input was provided.

A second sequence Seq2 includes capacitive touch points E, F, G, H. As illustrated, this can be formed by braiding the set of transmitter conductive threads in an order 212-1(T), 212-2(T), 212-3(T), 212-4(T) and braiding the set of receiver conductive threads in an order 212-2(R), 212-3(R), 212-4(R), 212-1(R). A user's touch to each of the capacitive touch points E, F, G, H in order or at the same time can indicate the second sequence Seq2. In some examples, the controller can determine from a function mapping a second function that is assigned to the second sequence Seq2. The second sequence Seq2 can be mapped to a second function of a computing device 106, for example. In some examples, the controller can determine a location of the interactive cord corresponding to where the touch input was provided.

A third sequence Seq2 includes capacitive touch points I, J, K, L. As illustrated, this can be formed by braiding the set of transmitter conductive threads in an order 212-1(T), 212-2(T), 212-3(T), 212-4(T) and braiding the set of receiver conductive threads in an order 212-3(R), 212-4(R), 212-1(R), 212-2(R). A user's touch to each of the capacitive touch points I, J, K, L in order or at the same time can indicate the second sequence Seq3. In some examples, the controller can determine a third function mapped to the third sequence Seq3 from a table or other data store indicating functions assigned to particular sequences. The third sequence Seq3 can be mapped to a third function of the computing device, for example. In some examples, the controller can determine a location of the interactive cord corresponding to where the touch input was provided.

A fourth sequence Seq4 includes capacitive touch points M, N, O, P. As illustrated, this can be formed by braiding the set of transmitter conductive threads in an order 212-1(T), 212-2(T), 212-3(T), 212-4(T) and braiding the set of receiver conductive threads in an order 212-1(R), 212-4(R), 212-3(R), 212-2(R). A user's touch to each of the capacitive touch points M, N, O, P in order or at the same time can indicate the second sequence Seq4. In some examples, the controller can determine a fourth function mapped to the fourth sequence Seq4 from a table or other data store indicating functions assigned to particular sequences. The fourth sequence Seq4 can be mapped to a fourth function of the computing device, for example. In some examples, the controller can determine a location of the interactive cord corresponding to where the touch input was provided.

FIG. 13 illustrates one example of a non-repetitive coded pattern that forms a one-dimensional code. In another example, a multidimensional code such as a two-dimensional code can be formed by utilizing a non-repetitive coded pattern in a lateral direction as well as the longitudinal direction.

Figure 14:
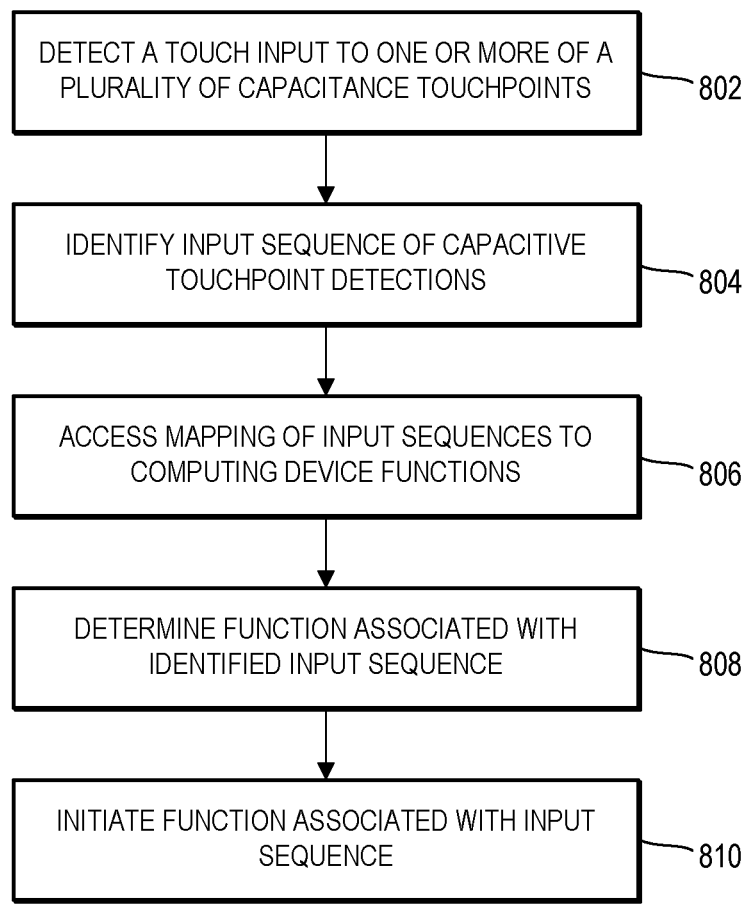
FIG. 14 is an example flowchart illustrating an example method of triggering a function based on touch input to an interactive cord in accordance with example embodiments of the present disclosure.
Figure 15:
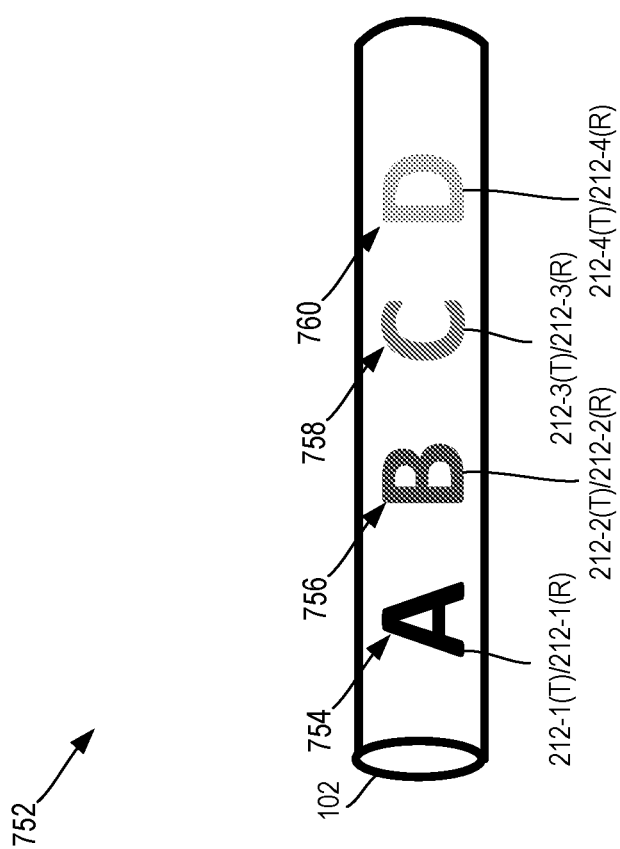
FIG. 15 illustrates an example of an interactive cord including a visual element formed from one or more conductive lines that are mapped to a function associated with the visual element in accordance with example embodiments of the present disclosure.

FIG. 14 is a flowchart depicting an example method 800 of initiating a function at a computing device based on detecting a gesture using an interactive cord in accordance with one or more embodiments of the disclosed technology. One or more portions of method 800 can be implemented by one or more computing devices such as, for example, one or more computing devices of a computing system 1002 as illustrated in FIG. 15. One or more portions of method 800 can be implemented as an algorithm on the hardware components of the devices described herein to, for example, detect touch input to determine a touch input sequence and a function associated with the touch input sequence. In example embodiments, method 800 may be performed by a gesture manager implemented using one or more computing devices 106 of a computing system. Additionally and/or alternatively, method 800 may be implemented by a combination of sensing circuitry within an internal electronics module of an interactive cord and a gesture manager implemented in removable electronics module or an external computing device.

At (802), a touch input is detected to one or more of a plurality of capacitive touch points of the interactive cord. At (804), an input touch sequence to the plurality of capacitive touch points is determined based on the touch input received at (802). It is noted that the input touch sequence can be detected within a larger input pattern. For example, a user may swipe down the length of an interactive cord providing input to a plurality of capacitive touch points. An input sequence may be detected from a subset of the plurality of capacitive touch points which are detected as having been touched.

At (806), a mapping of input sequences to one or more functions is accessed. For example, a table or other data store may store an indication of the input sequence and a corresponding function to be triggered by an external computing device or removable electronics module in response to the input sequence. In some examples, the function may be an authentication function. In other examples, the function may be a function associated with the computing device or an application of the computing device.

At (808) one or more functions associated with the input sequence are determined based on the mapping. At (810) a function is initiated at the remote computing device or removable electronics module.

In some examples, colored or other visually distinguishable conductive threads can be used to generate a visual element on the outer surface of the interactive cord. In some examples, the visual element can correspond to a function of the interactive cord and/or a computing device, or can provide an instruction or guidance to user as to how to use the interactive cord.

FIG. 15 depicts an example 752 of an interactive cord 102 including one or more conductive lines that are braided to form a visual element corresponding to a capacitive touch input location. For example, four transmitter conductive threads and four receiver conductive threads can be selectively braided to form a touch-sensitive area for interactive cord 102. The first transmitter conductive thread 212-1(T) can be braided with a first receiver conductive thread 212-(Z) at a first longitudinal portion of the interactive cord 102 to form a visual element 754 (e.g., the letter 'A'). One or more capacitive touch points can be formed by braiding the first transmitter and first receiver conductive threads. The first transmitter conductive thread and the first receiver conductive threads can have a visual appearance, such as a color, that distinguishes the conductive thread from other conductive threads or non-conductive threads. A touch input detected at the longitudinal portion of the interactive cord corresponding to the visual element 754 may initiate an assigned function at a computing device (e.g., text entry for the letter 'A').

A second transmitter conductive thread 212-2(T) can be braided with a second receiver conductive thread 212-2(R) at a second longitudinal portion of the interactive cord 102 to form a visual element 756 (e.g., the letter 'B'). One or more capacitive touch points can be formed by braiding the second transmitter and second receiver conductive threads. The second transmitter conductive thread and the second receiver conductive threads can have a visual appearance, such as a color, that distinguishes the conductive thread from other conductive threads or non-conductive threads. A touch input detected at the longitudinal portion of the interactive cord corresponding to the visual element 756 may be initiate an assigned function at a computing device (e.g., text entry for the letter 'B').

A third transmitter conductive thread 212-3(T) is braided with a third receiver conductive thread 212-3(R) at a third longitudinal portion of the interactive cord 102 to form a visual element 758 (e.g., the letter 'C'). One or more capacitive touch points can be formed by braiding the third transmitter and third receiver conductive threads. The third transmitter conductive thread and the third receiver conductive threads can have a visual appearance, such as a color, that distinguishes the conductive thread from other conductive threads or non-conductive threads. A touch input detected at the longitudinal portion of the interactive cord corresponding to the visual element 758 may initiate an assigned function at a computing device (e.g., text entry for the letter 'C').

A fourth transmitter conductive thread 212-4(T) is braided with a fourth receiver conductive thread 212-4(R) at a fourth longitudinal portion of the interactive cord 102 to form a visual element 760 (e.g., the letter 'D'). One or more capacitive touch points can be formed by braiding the fourth transmitter and fourth receiver conductive threads. The fourth transmitter conductive thread and the fourth receiver conductive threads can have a visual appearance, such as a color, that distinguishes the conductive thread from other conductive threads or non-conductive threads. A touch input detected at the longitudinal portion of the interactive cord corresponding to the visual element 760 may initiate an assigned function at a computing device (e.g., text entry for the letter 'B').

It is noted that additional techniques may be utilized for visual elements. For example, additional visual elements may be formed by forming capacitive touch points from additional pairs of transmitter and receiver conductive threads (e.g., transmitter thread 212-1(T) and receiver thread 212-2(R)). In another example, a visual element may correspond to a sequence of capacitive touch points. For example, with reference to FIG. 15, visual element 754 may be formed by sequence of capacitive touch points such as Seq1 shown in FIG. 13.

Figure 16:
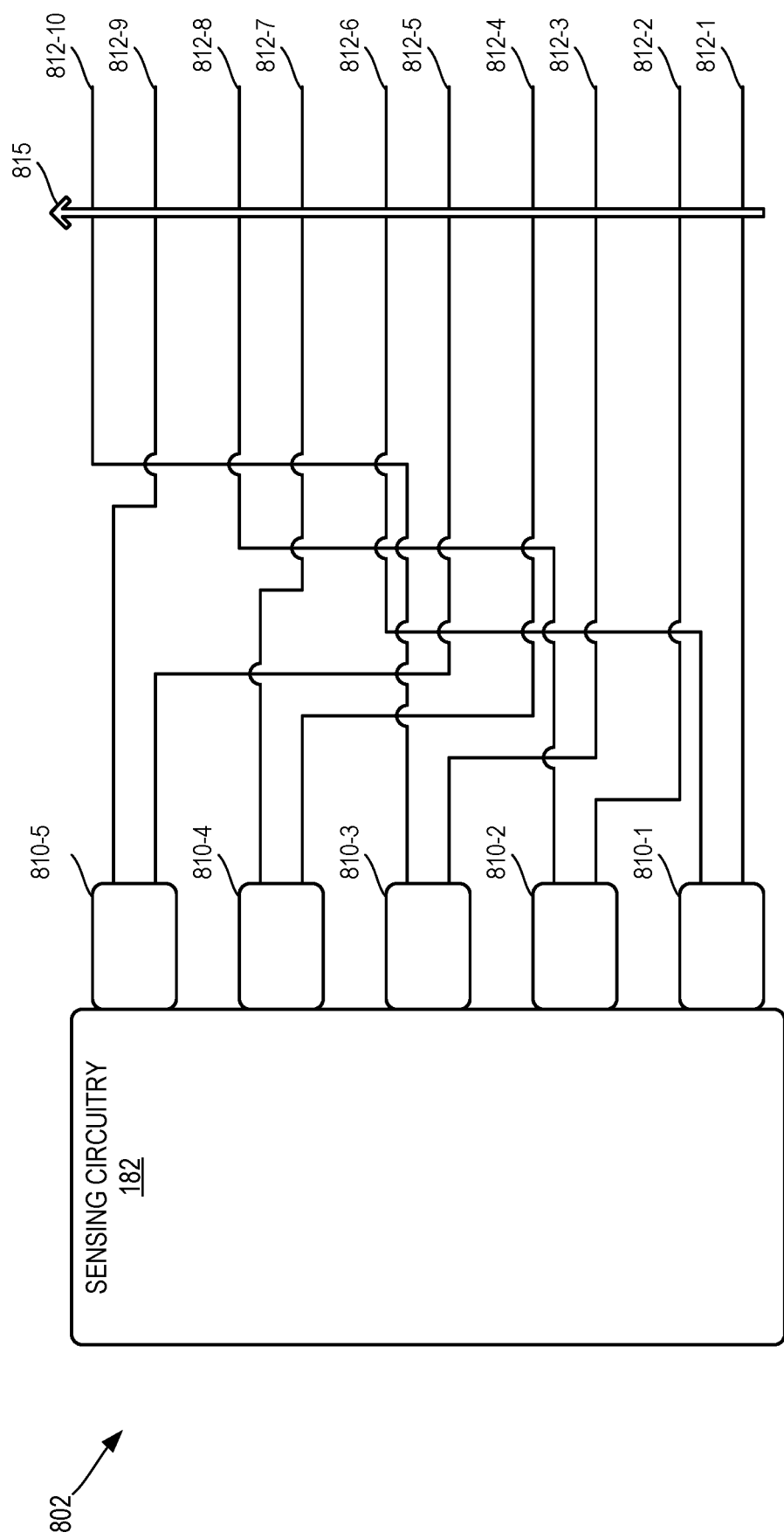
FIG. 16 illustrates a block diagram of an example computing system including an interactive cord and sensing circuitry in accordance with example embodiments of the present disclosure.

FIG. 16 illustrates an example of a computing system 802 including an interactive cord 102 and sensing circuitry 182 in accordance with example embodiments. In computing system 802, conductive threads 812 are coupled to sensing circuitry using device pins 810, also referred to as a contact pads. A diplex architecture is used whereby two conductive threads 812 share a single device pin. This architecture reduces the number of device pins for a given number of conductive threads.

In computing system 802, conductive thread 812-1 is connected to a first device pin 810-1. Conductive thread 812-6 is also connected to device pin 810-1. Conductive thread 812-2 and conductive thread 812-8 are connected to a second device pin 810-2. Conductive thread 812-3 and conductive thread 812-10 are connected to a third device pin 810-3. Conductive thread 812-4 and conductive thread 812-7 are connected to a fourth device pin 810-4. Conductive thread 812-5 and conductive thread 812-9 are connected to a fifth device pin 810-5.

According to some examples, a duplex-coded touch slider sensor element can be created in the longitudinal direction along the length of the string using such an architecture. More particularly, a slide input gesture provided along the length of the interactive cord in the longitudinal direction can be detected using a sensor assembly where the number of conductive threads (sensors) is greater than the number of device pins. In this example, sensing circuitry 182 can detect a slide input gesture in the longitudinal direction 815 along the length of the cord. For example, a slide input gesture may include a user's finger touching or coming close to the conductive threads in an order 812-1, 812-2, 812-3, 812-4, 812-5, 812-6, 812-7, 812-8, 812-9, and 812-10. In response, sensing circuitry will detect an input at device pins 810 in an order 810-1, 810-2, 810-3, 810-4, 810-5, 810-1, 810-4, 810-2, 810-5, and 810-3. In response to a detection in this order, sensing circuitry 182 can determine that an input slide gesture was provided in the longitudinal direction 815 of the interactive cord. A lace-braided pattern, such as a torchon lace-braided pattern may be used to configure the conductive threads for attachment to the device pins 810.

FIG. 17 illustrates various components of an example computing system 1002 that can implement any type of client, server, and/or computing device described herein. In embodiments, computing system 1002 can be implemented as one or a combination of a wired and/or wireless wearable device, System-on-Chip (SoC), and/or as another type of device or portion thereof. Computing system 1002 may also be associated with a user (e.g., a person) and/or an entity that operates the device such that a device describes logical devices that include users, software, firmware, and/or a combination of devices.

Computing system 1002 includes a communication interface 1014 that enables wired and/or wireless communication of data 1008 (e.g., received data, data that is being received, data scheduled for broadcast, data packets of the data, etc.). Data 1008 can include configuration settings of the device, media content stored on the device, and/or information associated with a user of the device. Media content stored on computing system 1002 can include any type of audio, video, and/or image data. Computing system 1002 includes one or more data inputs via which any type of data, media content, and/or inputs can be received, such as human utterances, touch data generated by an interactive cord 102, user-selectable inputs (explicit or implicit), messages, music, television media content, recorded video content, and any other type of audio, video, and/or image data received from any content and/or data source.

Communication interfaces can be implemented as any one or more of a serial and/or parallel interface, a wireless interface, any type of network interface, a modem, and as any other type of communication interface. Communication interfaces provide a connection and/or communication links between computing system 1002 and a communication network by which other electronic, computing, and communication devices communicate data with computing system 1002.

Computing system 1002 includes one or more processors 1004 (e.g., any of microprocessors, controllers, and the like), which process various computer-executable instructions to control the operation of computing system 1002 and to enable techniques for, or in which can be embodied, interactive cord. Alternatively or in addition, computing system 1002 can be implemented with any one or combination of hardware, firmware, or fixed logic circuitry that is implemented in connection with processing and control circuits. Although not shown, computing system 1002 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1002 also includes memory 1006 which may include computer-readable media, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Memory 1006 may also include a mass storage media device of computing system 1002.

Computer-readable media provides data storage mechanisms to store device data, as well as computer-readable instructions 1010 which can implement various device applications and any other types of information and/or data related to operational aspects of computing system 1002. For example, an operating system can be maintained as a computer application with computer-readable media and executed on processors 1004. Device applications may include a device manager, such as any form of a control application, software application, signal-processing and control module, code that is native to a particular device, a hardware abstraction layer for a particular device, and so on.

Memory 1006 may also include a gesture manager 1012. Gesture manager 1012 is capable of interacting with applications and interactive cord 102 effective to activate various functionalities associated with computing device 106 and/or applications through touch-input (e.g., gestures) received by interactive cord 102. Gesture manager 1012 may be implemented at a computing device 106 that is local to object 120 or remote from object 120. Gesture manager 1012 is one example of controller 117.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An interactive cord, comprising:
an outer cover having a touch-sensitive area at a first longitudinal portion of the interactive cord and a non-touch-sensitive area at a second longitudinal portion of the interactive cord, the outer cover comprising a set of conductive lines and one or more of a plurality of non-conductive lines at the first longitudinal portion, the set of conductive lines defining a plurality of intersections that each form a capacitive touchpoint at the touch-sensitive area; and
an inner core comprising at least the set of conductive lines and at least one of the plurality of non-conductive lines at the second longitudinal portion of the interactive cord.

2. The interactive cord of claim 1, wherein:
the set of conductive lines is braided with the one or more of the plurality of non-conductive lines at the first longitudinal portion.

3. The interactive cord of claim 1, wherein:
the set of conductive lines is lace-braided with the one or more of the plurality of non-conductive lines to form one or more torchon-lace patterns at the first longitudinal portion.

4. The interactive cord of claim 1, wherein:
the outer cover comprises a uniform braiding appearance at the first longitudinal portion of the interactive cord and the second longitudinal portion of the interactive cord.

5. The interactive cord of claim 1, wherein:
the one or more of the plurality of non-conductive lines are braided with one or more additional non-conductive lines at the second longitudinal portion of the interactive cord.

6. The interactive cord of claim 5, wherein:
a number of the one or more additional non-conductive lines is equal to a number of the set of conductive lines.

7. The interactive cord of claim 1, wherein:
the inner core comprises a subset of the plurality of non-conductive lines at the first longitudinal portion of the interactive cord, the subset of the plurality of non-conductive lines being exclusive of the one or more of the plurality of non-conductive lines at the first longitudinal portion.

8. The interactive cord of claim 1, wherein:
the plurality of non-conductive lines includes a first non-conductive line that is part of the outer cover at the second longitudinal portion.

9. The interactive cord of claim 1, wherein:
the at least one of the plurality of non-conductive lines provides separation between the set of conductive lines and an external touch at the second longitudinal portion.

10. The interactive cord of claim 1, wherein:
the set of conductive lines includes transmitter conductive threads and receiver conductive threads; and
a subset of the plurality of non-conductive lines separates the transmitter conductive threads from the receiver conductive threads within the inner core of the interactive cord at the second longitudinal portion.

11. The interactive cord of claim 10, wherein:
the transmitter conductive threads form a first cluster within the inner core at the second longitudinal portion of the interactive cord;
the receiver conductive threads form a second cluster within the inner core at the second longitudinal portion of the interactive cord; and
the transmitter conductive threads are separated from the receiver conductive threads at the second longitudinal portion of the interactive cord by the subset of the plurality of non-conductive lines.

12. The interactive cord of claim 10, wherein:
the transmitter conductive threads form a first cluster within the inner core at the second longitudinal portion of the interactive cord;
each of the receiver conductive threads at the second longitudinal portion is separated from other receiver conductive threads in a circumferential direction of the interactive cord; and
the receiver conductive threads are separated from the transmitter conductive threads at the second longitudinal portion in a radial direction of the interactive cord.

13. The interactive cord of claim 12, wherein:
the transmitter conductive threads are positioned at a center of the interactive cord at the second longitudinal portion.

14. The interactive cord of claim 12, wherein:
the set of conductive lines includes transmitter conductive threads and receiver conductive threads; and
at one or more locations of the first longitudinal portion of the interactive cord, each transmitter conductive thread is separated circumferentially from other transmitter conductive threads by at least one receiver conductive thread.

15. The interactive cord of claim 10, wherein:
the transmitter conductive threads are braided in a first circumferential direction around the interactive cord at the touch-sensitive area; and
the receiver conductive threads are braided in a second circumferential direction around the interactive cord at the touch-sensitive area.

16. The interactive cord of claim 1, wherein:
the plurality of intersections is formed in a non-repetitive coded pattern along a longitudinal direction of the interactive cord.

17. The interactive cord of claim 16, wherein the non-repetitive coded pattern includes:
a one-dimensional code.

18. The interactive cord of claim 16, wherein the non-repetitive coded pattern includes:
a two-dimensional code.

19. The interactive cord of claim 16, wherein:

the set of conductive lines is a set of conductive threads; and the plurality of non-conductive lines is a plurality of non-conductive threads.

20. A method of forming an interactive cord, comprising:

providing a set of conductive lines and one or more of a plurality of non-conductive lines to form a touch-sensitive area at a first longitudinal portion of the interactive cord, the set of conductive lines defining a plurality of intersections that each form a capacitive touchpoint at an outer cover of the interactive cord at the touch-sensitive area; and providing the one or more of the plurality of non-conductive lines and at least one additional non-conductive line of the plurality of non-conductive lines at an inner core of the interactive cord to form a non-touch-sensitive area at a second longitudinal portion of the interactive cord.

21. An interactive fabric, comprising:

a multi-dimensional capacitive touch sensor comprising a first set of conductive lines and a second set of conductive lines and one or more of a plurality of non-conductive lines forming an outer cover at a first longitudinal portion of the interactive fabric, the first set of conductive lines and the second set of conductive lines defining a plurality of intersections that each form a capacitive touchpoint for the multi-dimensional capacitive touch sensor; and wherein the first set of conductive lines and the second set of conductive lines are provided within an inner core at a second longitudinal portion of the interactive fabric to form a non-touch-sensitive portion of the interactive fabric.

* * * * *